(12) United States Patent
Sinclair et al.

(10) Patent No.: US 8,249,994 B2
(45) Date of Patent: Aug. 21, 2012

(54) SYSTEM FOR MANAGEMENT OF OIL AND GAS MINERAL INTERESTS

(75) Inventors: Willam R. Sinclair, Dallas, TX (US); Robert E. W. Sinclair, Dallas, TX (US)

(73) Assignee: Agelio Networks, Inc., Dallas, TX (US)

( * ) Notice: Subject to any disclaimer, the term of this patent is extended or adjusted under 35 U.S.C. 154(b) by 1052 days.

(21) Appl. No.: 11/697,170

(22) Filed: Apr. 5, 2007

(65) Prior Publication Data

US 2008/0249790 A1    Oct. 9, 2008

(51) Int. Cl.
*G06Q 10/00* (2012.01)
(52) U.S. Cl. ........................................................ 705/313
(58) Field of Classification Search ................ 705/1, 1.1, 705/313
See application file for complete search history.

(56) References Cited

U.S. PATENT DOCUMENTS

| 6,557,009 B1 * | 4/2003 | Singer et al. | 707/104.1 |
| 2006/0125828 A1 * | 6/2006 | Harrison et al. | 345/441 |

* cited by examiner

*Primary Examiner* — Heidi Riviere
(74) *Attorney, Agent, or Firm* — Sheridan Ross P.C.

(57) ABSTRACT

A system for managing mineral interests includes at least one database for storing data records relating to oil and gas mineral interest. A server enables generation of a graphical user interface at a plurality of locations over an open network. The graphical user interface enables creation and editing of data records stored in the at least one database from the plurality of locations and the editing may occur over the open network. The graphical user interface further enables viewing of data records from the plurality of locations over the open network.

20 Claims, 28 Drawing Sheets

FIG. 8

| Dashboard | Deed Management | Well Management | Lease Management | Reports | Management Console | Help |

Group: Agelio Networks (change)

Ⓧ ◯ MineralFile – Home | Ⓧ ◯ Caithness / c-bsincial...

Deed Maintenance
Deed Number: 100000

Deed Overview — 802                                    Expand All

804 — State  [TX ▼]   806 — County [Tarrant ▼]
808 — Grantor Name [Fred Flintsone]
810 — Grantee Name [Agelio Networks]
812 — Volume [201]   814 — Page [56]   Recorded Date [10/19/2006]
818 — Gross Acres [ ]   820 — Net Acres [ ]                816
822 — Comments [ ]
824 — [Update]

⊕ Conveyances(1)     Add New
⊕ Grantors(1)        Add New
⊕ Grantees(1)        Add New
⊕ Leases(1)          Add New
⊕ Wells(1)           Add New
⊕ Attachments(1)     Add New

FIG. 9

```
| ⊗ ○ MineralFile – Home | ⊗ ○ Caithness / c-bsincial… |

◆ MineralFile                    Welcome Bill        QUICK SEARCH              County  ◆
                                 My Account                                    Search
                                 Logout Dashboard | Deed Management | Lease Management | Well Management | Reports | Management Console | Help Group: Agelio Networks (change)
Deed Maintenance
Deed Number: 100000
                                                                                              ⊞ Expand All
📄 Deed Overview ~802

✎ Conveyances(1) ~902            ⊕ Add New ~914
   Interest Type: RI – Royalty Interest ~904    Interest Conveyed: 0.01256 ~906    Conveyance Description:
                                                                                              ~908
        ⎧ Tract #001
   910 ⎨ ✎ ⊙ Survey: W. SMITH  Abstract: 345  Block: 0                                    912 ~ ⊕ Add New
        ⎩   A long land description here.

📄 Grantors(1) ~916             ⊕ Add New ~926
📄 Grantees(1) ~918             ⊕ Add New ~926
📄 Leases(1) ~920               ⊕ Add New ~926
📄 Wells(1) ~922                ⊕ Add New ~926
📄 Attachments(0) ~924

Home | About MineralFile | Privacy | Terms of Use | Site Map | Advertising | Register | Contact Us
```

FIG. 11

Update

📄 Conveyances(1)

✏️ ⊕ Add New

ⓘ Interest Type: RI – Royalty Interest    Interest Conveyed: 0.01256    Conveyance Description:

Tracts:
✏️ Tract #001
ⓘ Survey: W. SMITH  Abstract: 345  Block: 0
A long land description here.

⊕ Add New

📄 Grantors(1) ~1102           ⊕ Add New ~1106

✏️ Fred Flinstone
123 Main St.         } 1108
Dallas, TX 75205
214-555-5555
fred@flinstone.com 📄 Grantees(1) ~1104           ⊕ Add New ~1112

✏️ Agelio Networks
7001 Preston Rd.
Suite 301 LB 35      } 1110
Dallas, TX 75205

FIG. 12A http://192.168.50.4/MineralFile/DeedMgmt/deedMain ▼ | Go | buggatti | ▶ | Search Leases(1) ~1202

1106~ ⊕ Add New ~1108

Lease Name: Bedrock ~1110
Lease Type: PaidUp ~1112

Lease Bonus
Total: 5000 ~1114

Recording Data
Volume: 125 ~1116
Gross Acres: ~1118
Royalty: 0.125 ~1120
HBP: No ~1122
Institution Date: 10/21/2006 ~1124
Expiration Date: 10/21/2011 ~1126

Continuous Drilling
Drill Clause: No ~1128
Drill Period: ~1130

Lessees
Lessors

Associated Tracts
CI – RI: 0.01256: ⎤ 1148
– Tract #001 ⎦

Per Acre: 90 ~1132

Page: 65 ~1134
Net Acres: ~1136

HBP Acreage: ~1138
Primary Term: 5 ~1140
Pugh Clause: No ~1142

Start Date: ~1144
End Date: ~1146

⊕ Add New ~1150
⊕ Add New ~1152

TO FIG. 12B

FROM FIG. 12A

Wells(1) ~1204  ⊕ Add New ~1154

1256~ ✎ ⊖ Well Name: Bedrock H-1 ~1158
Associated Lease: Bedrock ~1160
Well Type: Horizontal ~1262
RRC Number: 223456 ~1264

Well Status: Producing ~1272
API Number: 42-656-78564 ~1274

Operator: ~1280
Big Oil Inc.

Decimal Interest
Decimal Interest: 0.125 ~1266
Division Order Decimal Interest: ~1268

Check Decimal Interest: ~1226
Engineering Decimal Interest: ~1228

Purchasers: ~1270

⊕ Add New ~1180

Attachments(0) ~1282    ⊕ Add New ~1284

Home | About MineralFile | Privacy | Terms of Use | Site Map | Advertising | Register | Contact Us

| Dashboard | Deed M |
| --- | --- |

Deed Maintenance
Deed Number: 1000

Lease Maintenance   1602

Deed Overview

Conveyances(1)     1604 — Lease Name  [Bedrock]

Grantors(1)        1606 — Lease Type  [Paid Up ▼]

Grantees(1)        Lease Bonus
                     1608 — Total [5000]   1610 — Per Acre [90]

Leases(1)          Recording Data
  Lease Name:        1612 — Volume [125]   1624 — Page [66]
  Lease Type:        1614 — Gross Acres []  1626 — Net Acres []
  Lease Bonus        1616 — Royalty [0.125]
    Total:           1618 — HBP [No ▼]     1628 — HBP Acreage []
  Recording Data     1620 — Institution Date [10/21/2006]
    Volume:          1622 — Expiration Date [10/21/2011]
    Gross Acres:                         Primary Term (years) []
    Royalty:                             1630
    HBP:                                 1632 — Pugh Clause [No ▼]
  Institution Date:  Continuous Drilling
  Expiration Date:   1634 — Drill Clause [No ▼]
  Continuous Drilling
  Drill Clause:      1636 — Drill Period []  1638 — Start Date [##/##/####]
  Drill Period:                              1640 — End Date []
  Lessees
  Lessors            Select Tracts:
                     ⊞ ☑ Deed: 100000 (TARRANT, TX)
                                                          1642
Wells(1)
                                                          [Update]  1644

FIG. 18

Reports

> Reports

Reports
Click on a report below to view it.

Available Reports ~2106

| | | |
|---|---|---|
| Engineering Report – Non-producing | | An engineering report listing all leases for non-producing wells by State & County. |
| Engineering Report – Producing | | An engineering report listing leases & wells for producing wells by State, County, and Interest Type. |
| Exhibit-A | | This report displays conveyances in Form style by State and County. |
| Exhibit-A (Paragraph Style) | | This report displays conveyances in Paragraph style by State and County with sorting by Interest Type. |
| Grantor Contacts | | This report displays contact information for Grantors. |
| Grantor Report | | This report displays lease and well data for a Grantor by State and County. |
| Lease Expiration | | This report lists all leases in order by Expiration Date. |
| Operator Contacts | | This report displays contact information for Operators. |
| Purchaser Contacts | | This report displays contact information for Purchasers. |

| Reports | ✎ Report Viewer |
|---|---|

State: TX  County/Parish: (ALL)  [View Report]
Interest Type: (ALL)

|◀ ◀ 1 Of 1 ▶ ▶|   Select a format ▼  Export

```
        Agelio Networks      Engineering Report      3/14/2007 10:11 AM
        Bill Sinclair           Producing Wells
STATE OF TX
COUNTY OF TARRANT Lease/Well              API            RRC        Decimal Interest    Interest Type Lease: Bedrock
Bedrock H-1             42-656-78564   223456     0.1250000000        Royalty Interest
Subtotal for Royalty Interest                     0.1250000000

Powered By MineralFile                Page 1 of 1
```

FIG. 23

| Reports | ✎ Report Viewer |
|---|---|

State: TX  County/Parish: (ALL)  [View Report]
Grantee: Agelio Networks

|◀ ◀ 1 Of 1 ▶ ▶|   Select a format ▼  Export

```
                            Exhibit 'A'
STATE OF TX
COUNTY OF TARRANT

Royalty Interest
0.013
Tract #:    1
        Survey:   W.        Abstract:  345     Block:   0
                  Smith
        A long land description here.

Page 1 of 1
```

MineralFile

Dashboard | Deed Management | Lease Management | Well Management | Reports | Management Console | Help > Reports Group: Agelio Networks (change)

Manage Users

Current Members ~2406

2420~[Add Member]

| Edit 2408 | Email 2410 | First Name 2412 | Last Name 2414 | Locked? 2416 | Last Login 2418 |
|---|---|---|---|---|---|
| ✎ | bill@castletonenergy.com | Bill | Sinclair | ☐ | 2/21/2007 5:45:15 PM |
| ✎ | cbrown@castletonenergy.com | Cynthia | Brown | ☐ | 2/21/2007 6:09:45 PM |
| ✎ | morman@castletonenergy.com | Robert | Norman | ☐ | 2/6/2007 4:12:45 PM |
| ✎ | shudspeth@castletonenergy.com | Sharon | Hudspeth | ☐ | 2/6/2007 1:47:01 AM |
| ✎ | sinclair@castletonenergy.com | Robert | Sinclair | ☐ | 2/16/2007 8:42:37 PM |

Home | About MineralFile | Privacy | Terms of Use | Site Map | Advertising | Register | Contact Us

User Information — 2502

First Name: Bill    Last Name: Sinclair
2512 — Address: 7001 Preston Rd. Suite 301 LB 35    2506 — Phone: 214-520-6385
2518 — Zip Code: 75205    2508 — Alternate Phone: 214-432-0905
2514 — City: Dallas    State: TX    2510 — Web Address:
2520 — Save

Email Preferences

Email Option 1: ☐ Monthly Newsletter
Email Option 2: ☐ Scheduled Reports Subscription
Save

2522

Change Login — 2524

Email Address: bill@castletonenergy.com — 2504
Current Password: — 2526
New Password: — 2528
Confirm Password: — 2530
Save — 2532

Company/Group Security Information

Account: Agelio Networks

SYSTEM FOR MANAGEMENT OF OIL AND GAS MINERAL INTERESTS

TECHNICAL FIELD

The present invention relates to the management of oil and gas mineral interests, and more particularly, to a web based application utilizing a central server and browser applications to enable management of oil and gas mineral interests.

CROSS-REFERENCE TO RELATED APPLICATIONS

None.

BACKGROUND

Land management has historically been a labor intensive process. Organizations of all sizes rely foremost on hard copies of land files and often a series of spreadsheets and/or desktop databases in order to manage data relating to oil and gas mineral interests. This makes data retrieval cumbersome and expensive even under the most well organized conditions. In order to find information in presently existing configurations, an individual must search through extensive files and/or spreadsheets in order to find the information which they are searching for. Additionally, when new information is entered, the date must be properly cataloged in order to ensure that it is properly inserted within the database. Finally, when hard copy files are utilized, the amount of access to this information is limited since an individual must come to where the files are physically stored. This limits the ability for organizations to share the data across the organization. Thus, there is a need for a system that can centrally store information related to oil and gas mineral interests and provide for fast retrieval of the information based upon various parameters within the data.

SUMMARY

The present invention, as disclosed and claimed herein, in one aspect thereof, comprises a system for managing mineral interests. The system includes at least one database for storing data records relating to oil and gas mineral interest. A server enables generation of a graphical user interface in each browser at a plurality of locations over an open network. The graphical user interface enables viewing of the data records from the plurality of locations over the open network. The graphical user interface further enables creation and editing of data records stored in the at least one database from the plurality of locations.

BRIEF DESCRIPTION OF THE DRAWINGS

For a more complete understanding of the present invention and the advantages thereof, reference is now made to the following description taken in conjunction with the accompanying Drawings in which:

FIG. 8 illustrates the graphical user interface of the deed maintenance page;

FIG. 9 illustrates the graphical user interface of the conveyances page;

FIG. 11 illustrates the graphical user interface for the grantor and grantee page;

FIGS. 12A-12B illustrate the graphical user interface for the leases page and the wells page;

FIG. 13 illustrates the graphical user interface for the deed attachment page;

FIG. 14 illustrates the graphical user interface for the deed search functionality;

FIG. 16 illustrates the graphical user interface for the lease maintenance window;

FIG. 18 illustrates the graphical user interface for the well maintenance window;

FIG. 21 illustrates the graphical user interface for the reports page;

FIG. 22 illustrates a first type of report provided by the system;

FIG. 23 illustrates an alternative report provided by the system;

FIG. 24 illustrates the graphical user interface for the manage users page;

FIG. 25 illustrates the graphical user interface for the user profile page;

DETAILED DESCRIPTION

Figure 1:
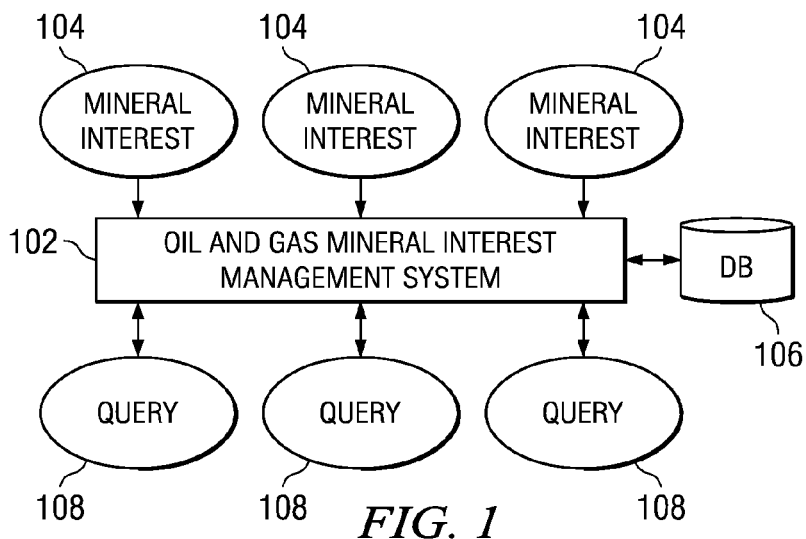
FIG. 1 illustrates the general concept for managing oil and gas mineral interest according to the present disclosure.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Referring now to FIG. 1, there is illustrated the general concept of the manner in which oil and gas mineral interests may be managed. The oil and gas mineral interest management system 102 acts as a central repository for managing information related to oil and gas mineral interests in a centralized fashion. Mineral interest information 104 is provided to the oil and gas mineral interest system 102 which may be used to process or edit this information enabling it to be stored within a centralized database repository 106. Once data related to various mineral interests 104 has been stored within the database 106 through the oil and gas mineral interest management system 102, queries 108 may be made to the oil and gas mineral interest management system 102 enabling users to obtain all types of information about various deeds, leases and wells from the centralized database repository 106. As with respect to entry of the mineral interest 102, all queries are made through the oil and gas interest management system 102 which processes the queries and obtains the information from the database 106 and provides responses back to the queries 108.

Figure 2:
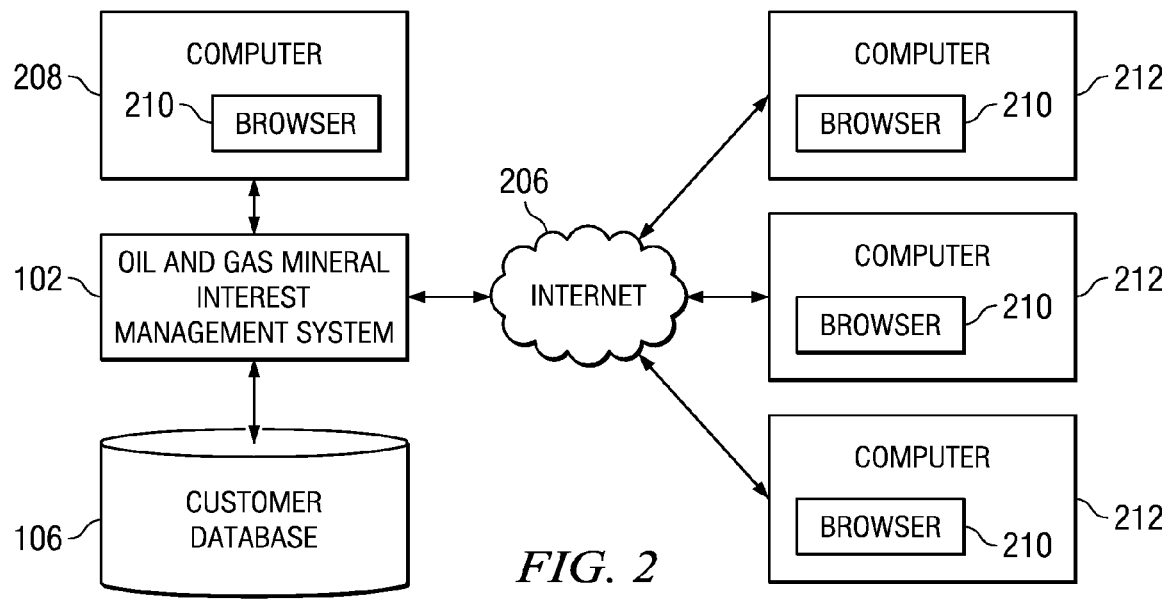
FIG. 2 illustrates the implementation of the oil and gas mineral interest management system over an open network such as the Internet.

Referring now to FIG. 2, there is illustrated the preferred manner of implementation of the oil and gas mineral interest management system 102 over an open network 206 such as the internet While the following description envisions the use of the oil and as mineral interest management system 102 upon an open network 206 such as the internet, the system may also be implemented within a smaller local area network or wide area network or additionally could be implemented upon a single computer wherein the described system for managing oil and gas mineral interests could be used by a single company or user.

The implementation of the oil and gas mineral interest management system 102 over an open network 206 such as the internet provides for the ability of the system to be much more widely used and enable access to the system 102 by a variety of customers who may find the information stored within the customer database 106 of beneficial use to them. Information related to mineral interests 104 or queries 108 may be entered into the oil and gas mineral interest management system 102 either locally through a computer 208 having a browser 210 associated therewith. Additionally, the queries 108 with respect to mineral interest 104 may be entered remotely through a client computer 212 that includes a browser 210 therein enabling communications with the oil and gas mineral interest management system 102 over the internet 206. The oil and gas mineral interest management system 102 is implemented upon a server computer that enables communication with the system 102 through the various browsers 210 either locally or remotely over the internet 206. The management system server would also include means for interfacing with the customer database 106 such that information may be stored therein responsive to inputs from the browsers 210 or data may be extracted from the database 106 responsive to queries from the browsers 210.

The browser interface may be implemented in a number of fashions. In one embodiment, the browser interface is merely transmitted to the browser 210 of a user computer 212, 208 when the user accesses the oil and gas mineral interest management system 102 using a commercially available browser such as Microsoft Explorer, Mozilla Firefox, etc. Additional implementations might utilize dedicated browser software that was specifically directed to communicating with the oil and gas mineral interest management system 102. In this case, a commercially available browser would not be necessary, but the software of the dedicated browser would have to be loaded onto the computer 212, 208 either by downloading the software or installing the software from a provided media. The installed software would be dedicated to communication with the oil and gas mineral interest management system 102.

Figure 3:
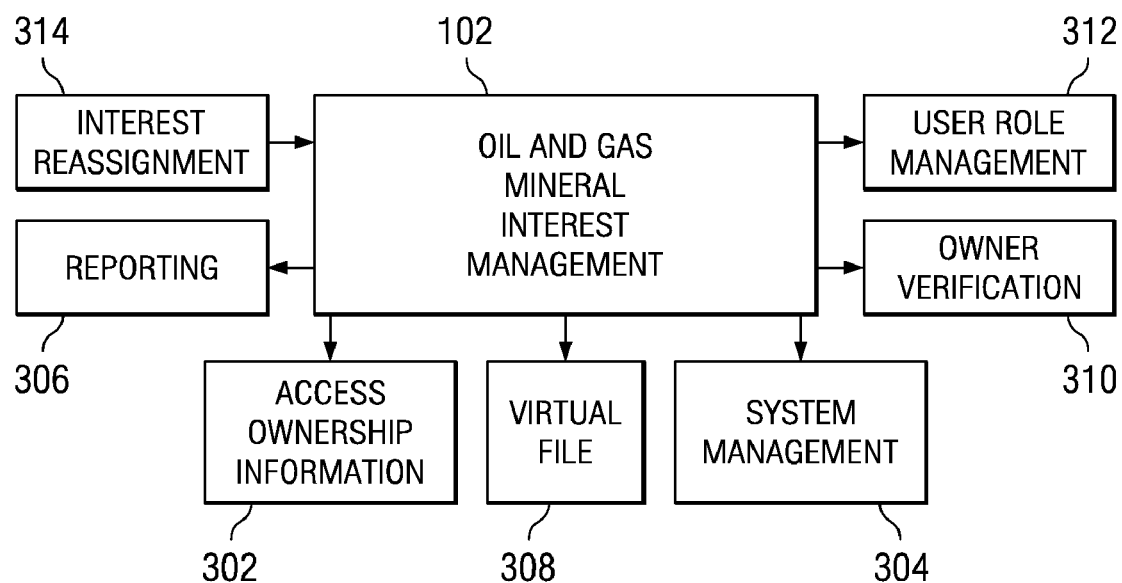
FIG. 3 illustrates various functionalities of the oil and gas mineral interest management system.

No matter which implementation for accessing the oil and gas mineral interest management system 102 is utilized, the oil and gas mineral interest management system 102 provides a number of important functionalities to users of the system. Various of these functionalities are more fully illustrated with respect to FIG. 3. The oil and gas mineral interest management system 102 provides access to ownership information functionalities 302. This enables users to manage various oil and gas mineral interests. Through these functionalities 302 a user may track mineral deeds, leases and wells within a secure web based environment using a web browser and internet connection. The ownership information functionalities 302 enable users to enter new records with respect to deed, lease and well information and further allows them to edit the records of previously entered deed, lease and well information. Furthermore, searching functionalities enable the users to search through and access previously entered mineral interest record information.

System management functionalities 304 enable the operator of the oil and gas mineral interest management system 102 to control the level of access of various users and/or customers. Users who are able to have access to the system may be established through these functionalities and the users roles and permissions within the system are established. Additionally, system managers may perform various system administration and account administration functions through the system management functionalities 304 in order to assist the system in operating in an optimal fashion.

Reporting functionalities 306 allow users to view various types of reports with respect to oil and gas mineral interests. The format of these reports may be pre-established and stored upon the system such that the available reports are merely accessed by a user. Alternatively, a report generation functionality may be used such that information stored within the customer database 106 may be accessed to provide a report based upon stored oil and gas mineral interest information. Finally, virtual file functionalities 308 enable .PDF files or other representations of stored documents associated with various oil and gas mineral interest to be stored with associated information within the customer database 106 and accessed therefrom. For example, a copy of the physical deed or lease may be stored with information on the deed or lease within the customer database 106 such that when information on this deed or lease is being accessed through the access ownership information functionalities 302, the user has the opportunity to view a copy of the physical lease or deed that is associated with the information that they are presently viewing.

The oil and gas mineral interest management system 102 also provides ownership verification 310, user role management 312 and the reassignment of interest 314 to other users and companies in the system. Ownership verification 310 enables the actual owners of royalty interests to be confirmed. User role management 312 enables the system operation to control user's roles within the system 102. Reassignment of interest functionalities 314 enable the ownership indication associated with particular interests to be quickly updated or reassigned.

Figure 4A:
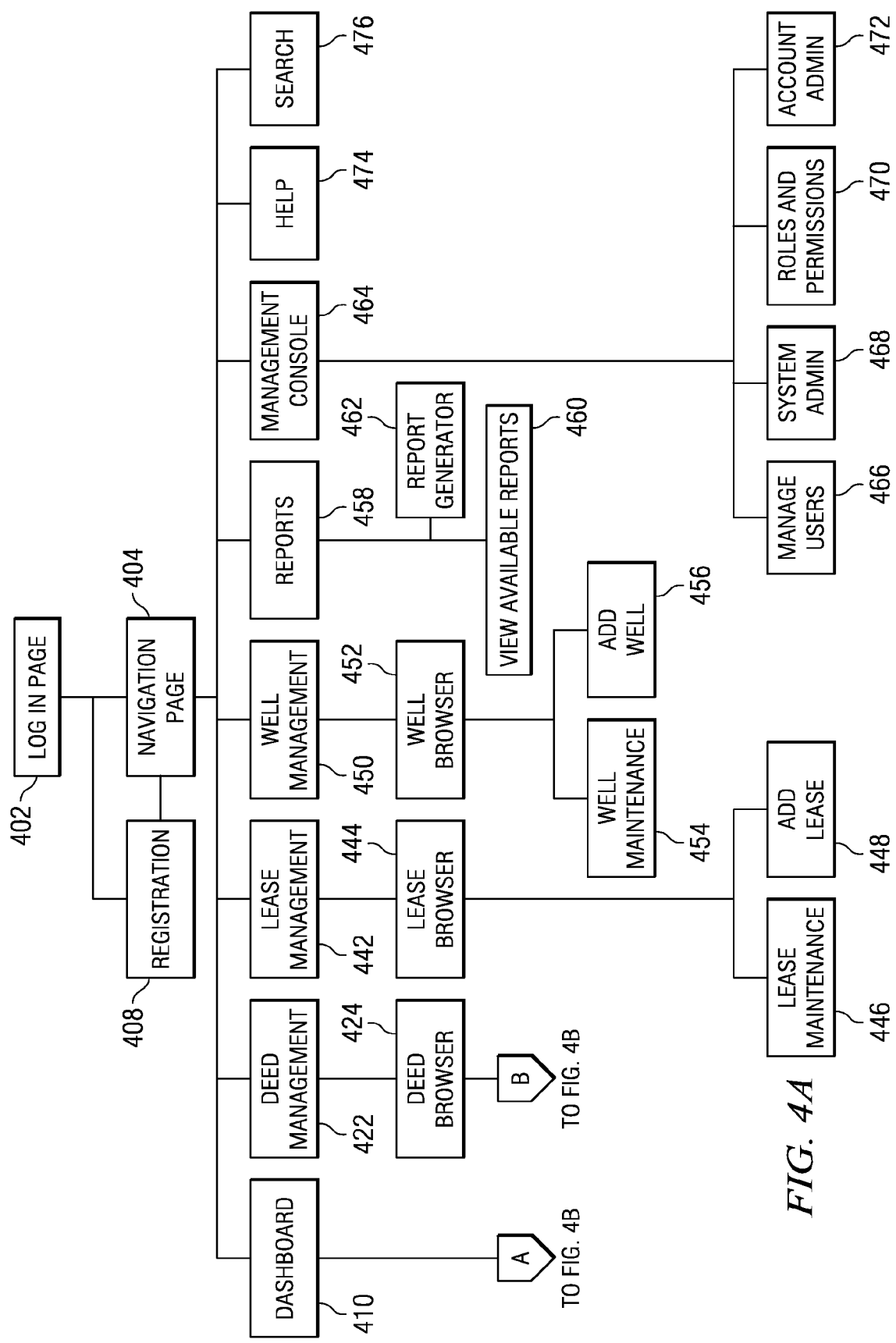
FIGS. 4A-4B provide a general functional illustration of the browser interface of the oil and gas mineral interest management system.
Figure 4B:
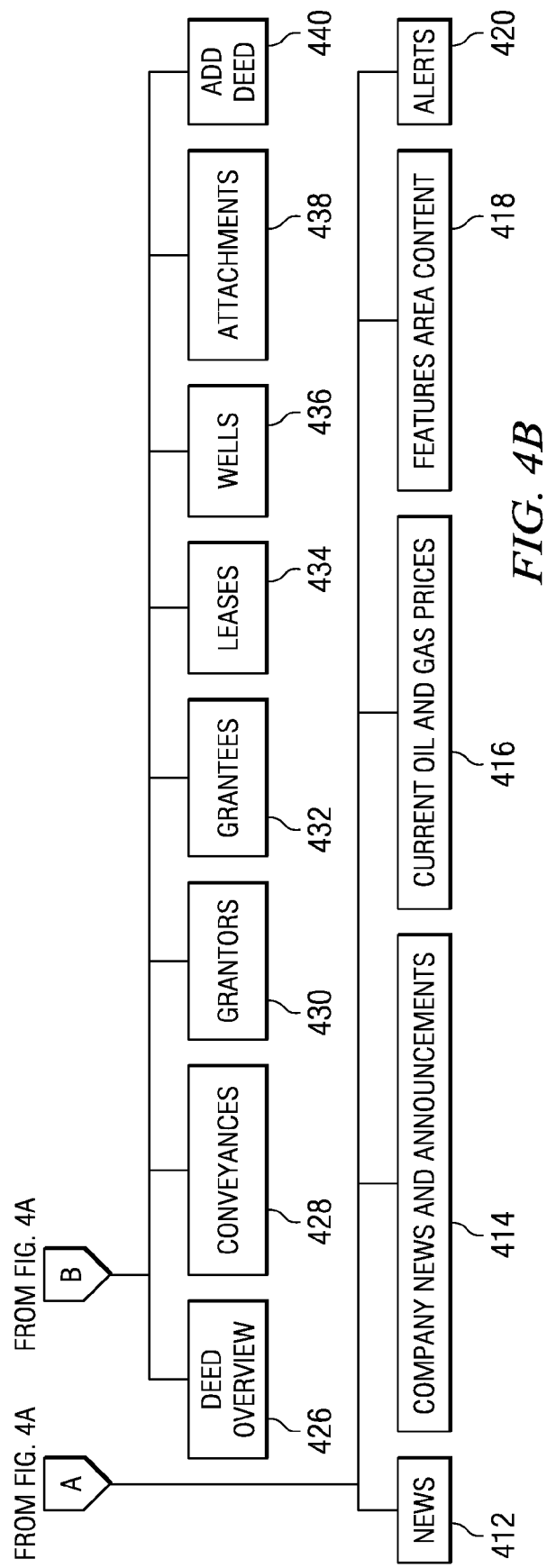

Referring now to FIGS. 4A-4B, there is provided a general functional illustration of the browser interface through which the user may enter and access oil and gas mineral interest information into the oil and gas mineral interest management system 102 of the present disclosure. A login page 402 enables users to login or register with the mineral interest management system 102. Existing users are able to enter a user ID/password combination that provides them access to the navigation page 404. The navigation page 404 provides access to all the various functionalities of the oil and gas mineral interest management system 102 as will be described more fully herein below. If a user accessing the login page 402 has not previously accessed the system 102 and established a user ID and password, the user is sent to the registration page 408. Through the registration page 408, the user is required to enter certain information to establish the identity of the user and to establish a password of the user. Once the user has been established as a verifiable user of the system, the user is enabled to go from the registration area 408 to the navigation page 404 to have access to the various system functionalities as permitted by their security level and group membership.

From the navigation page 404, the user is able to access a variety of functionalities provided by the oil and gas mineral interest management system 102. The first of these functionalities includes the dashboard 410. The dashboard 410 comprises a general bulletin board information center on which various information relevant to users working with or owning oil and gas mineral information may be provided. The dashboard 410 includes links to websites of interest to the oil and gas mineral interest owner and further provides alerts or messages requiring the users immediate attention. The news of interest may include specified links including oil and gas news 412. The information provided by the oil and gas news page 412 could comprise information from commercially available websites such as Google or Yahoo or additionally could provide information provided by various oil and gas subscription services that are available within the industry. The company news and announcement page 414 provides customer specific information with respect to the company customer that has logged into the oil and gas mineral interest management system 102. The current oil and gas prices page 416 provides links to oil and gas price quotes provided by various services accessible via the internet. The features area content 418 provides links to various types of oil and gas information that are available via the internet. These may comprise websites with specific oil and gas news related services or could include various state agencies that are oil and gas related. The alerts page 420 provides user specific alerts to the customer that has logged into the oil and gas mineral interest management system 102. Information of this type may include alerts relating to, for example, lease agreements that are shortly to expire which may require additional action on the part of the customer to renew the lease or at least notify the customer that the leased land interest will soon be available again.

Another section available via the navigation page 404 is the deed management page 422. The deed management page 422 enables a user to have access to a variety of stored deed information and further provides the ability to enter new deed information into the system and edit existing deed information. The new deed information may be entered in one embodiment by using an existing deed as a template in order to prevent the re-entry of identical information. A deed browser 424 displays a number of deeds that may be selected by the user to be viewed and edited. Additionally, a quick search function is used to quickly search through available deeds in order to locate specific deed information. Once a particular deed has been accessed, the deed overview page 426 provides various top level information with respect to the deed that has been accessed. A conveyances page 428 provides information with respect to the transfer of interests associated with the deed. The grantors page 430 provides information with respect to the grantors of the deed that is presently being accessed. The grantees page 432 provides information with respect to the grantees of the deed. The leases page 434 provides information describing leases that are associated with the deed that is presently being accessed through the deed browser 424. Likewise, well page 426 provides information on various wells that are on the land covered by the deed that is presently being viewed through the deed browser 424.

The attachments page 438 enables a user to attach documents that are relevant to a deed that is being viewed through the deed browser 424. This might include a .pdf or other type of electronic copy of the physical deed that is referenced by the information within the deed browser 424. Finally, the add deed page 440 enables a user to enter all of the information with respect to a new deed that is being entered into the oil and gas mineral interest management system 102. The add deed page 440 provides data fields for entering all of the respective information in each of the deed, including overview, conveyances grantors, grantees, leases, wells, and attachment sections described previously with respect to the pages accessible under the deed browser 424. Each of the data fields within the pages 426 through 438 of the deed browser 424 are also editable by the user so that any information may be updated as necessary.

The lease management page 442 enables a user to access and manage the information with respect to a number of leases by clicking on a lease indicator within the lease browser 444. Once a particular lease is opened within the lease browser 444, the lease maintenance page 446 enables the user to update information with respect to the accessed lease. Part of the lease maintenance page information may include cross references to the deeds including the land upon which the lease is maintained. An add lease page 448 enables a user to enter a completely new lease into the oil and gas mineral interest management system. The add lease page 448 includes all of the fields of the lease maintenance page but would initially appear blank such that the information could be entered by a user.

The navigation page 404 also provides access to a well management page 450. The well management page lists information with respect to particular wells. The well management page 450 displays a number of well indicators associated with particular wells through the well browser 452. By opening the indicator associated with a particular well, the well maintenance page 454 enables a user to update a variety of information with respect to a particular well. Any of the fields within the well maintenance page 454 may be updated by the user as the information changes. The add well page 456 includes the same fields as the well maintenance page 454, but when initially appearing, each of these fields are blank enabling a user to manually enter new information with respect to a new well to be tracked by the oil and gas mineral interest management system 102.

The reports section 458 accessed through the navigation page 404 provides a user with the ability to access various reports that are previously stored or may be generated from data stored within the database 106 associated with the oil and gas mineral interest management system 102. The view available reports page 460 provides direct access to previously generated reports that are grouped and associated by type. These reports are cataloged within a particular fashion within the view available reports page 460 so the user may quickly find a report they desire by knowing the type of report they are looking for. The report generation page 462 enables a user to create new as well as existing have reports generated from information stored within the database 106. Various parameters for the report are established by the user through the report generation page 462 before executing the search based upon the provided parameters.

The management console section 464, accessible via the navigation page 404, enables the user to manage various services and functionalities provided by the oil and gas mineral interest management system 102. The management console 464 provides a number of means for affecting the systems operation. The manage user page 466 enables the system operator to view the individuals that presently have access to the oil and gas mineral interest management system 102. The manage user page 466 provides information on the user, the last time the user accessed the system and provides the ability to edit the level of access the user has with respect to the system. The levels of access for a particular user may be edited through the roles and permissions page 470. The roles and permissions page 470 provides indications of what a user is able to do and provides access to the deed management, lease management and well management information stored within the system and provides indications of the level of access that may be obtained with respect to the reports provided by the system. For example, certain users may only be provided with the ability to view deed, lease and well information. Other users may have the ability to edit and add existing deed, lease and well management information. This would be established through the roles and permissions page 470.

The systems administration page 468 and account administration page 472 enable operators of the oil and gas mineral interest management system 102 to alter the way that the system operates through the system administration page 468 or control the manner in which particular users and user accounts may access the system through the account administration page 472.

The help page 474 provides various help topics to assist a user in accessing the various functionalities provided by the oil and gas mineral interest management system 102. These help topics are broken down by an index of topics through which the user can browse and select a particular topic. Additionally, the user can enter a text word to search for a particular topic within the help topics. Finally, an FAQ section is provided to the user to assist them with the most frequently asked questions.

The search function 476 is included on each of the pages accessible through the navigation page 404. The search function 476 enables a user to search for particular information associated with the section the user is presently accessing. Thus, for example, if the user was within the deed management page 422, various deeds could be searched for in the database. Likewise, if the user was within the lease management or well management pages, leases or wells could be searched for in the database. Likewise, in the reports page 458, particular reports could be searched for in the database. Thus, the search functionality 476 associated with the oil and gas mineral interest management system 102 provides the user with a variety of methods for searching the information stored within the system.

Figure 5:
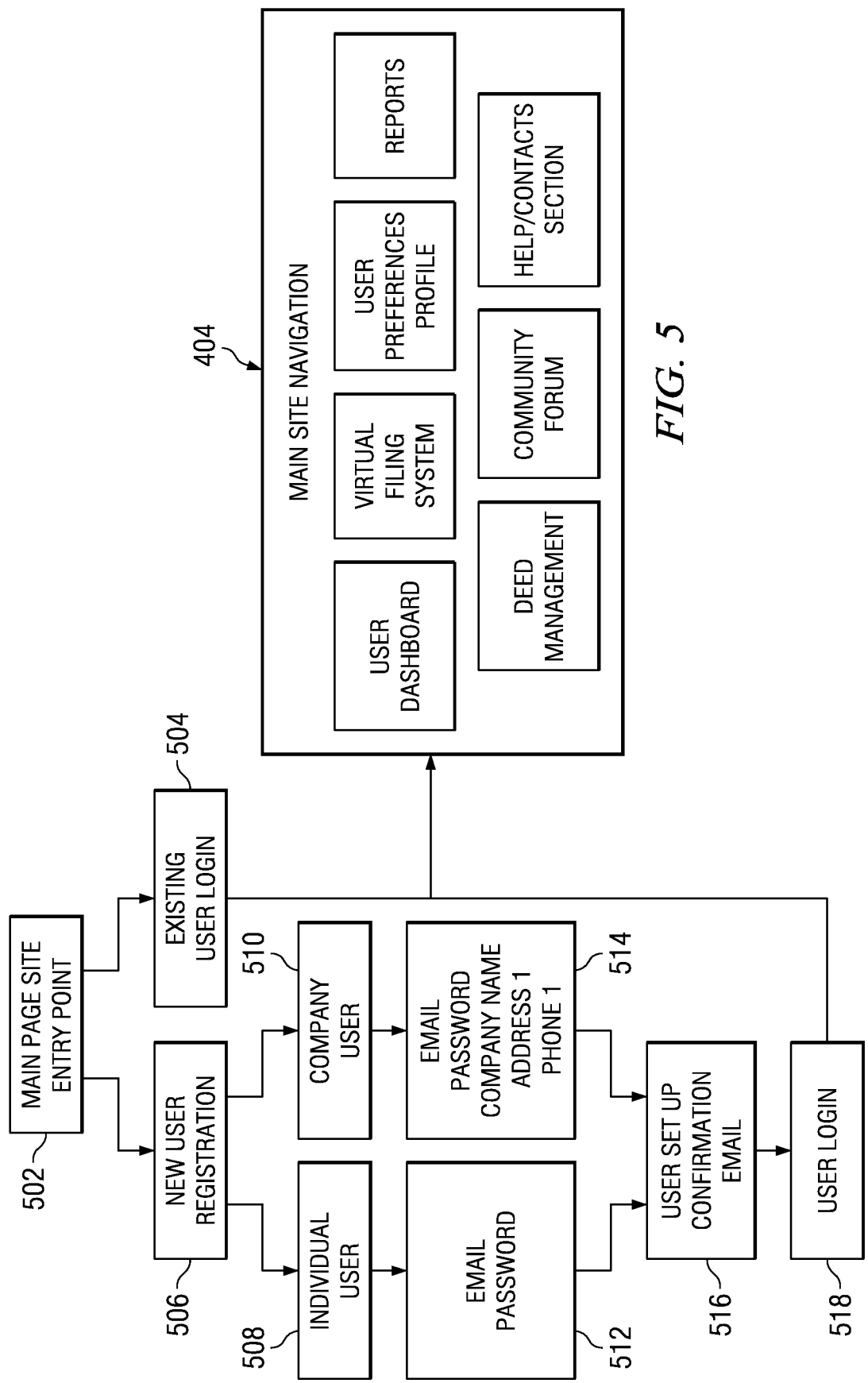
FIG. 5 is the flow diagram illustrating the manner for accessing the oil and gas mineral interest management system.

Referring now to FIG. 5, there is illustrated a flow diagram of the manner in which a user may access the system from the login page 402. While the present disclosure illustrates one manner for accessing the system 102, other methods may be utilized. Initially, the main page or site entry point is accessed at step 502. From the main page site entry point at step 502, the user may go through an existing user login at step 504 enabling them to access the main site navigation page 404 described previously with respect to FIG. 4. If the user is a new user, they go through the new user registration process beginning at step 506. Individual users access the system at step 508 and company users access the system at step 510. Individual users are required to enter an email identifier and a password at step 512. Company users are required to enter an email identifier, password, company name, address and phone number at step 514. Once this information has been entered for either the individual user 508 or company user 510, the user is sent a user set up confirmation email at step 516 confirming their registration with the system. The user may then login to the system at step 518 using their email identifier and password entered in the registration process. If correctly entered, they are provided access to the main site navigation page 404.

Figure 6:
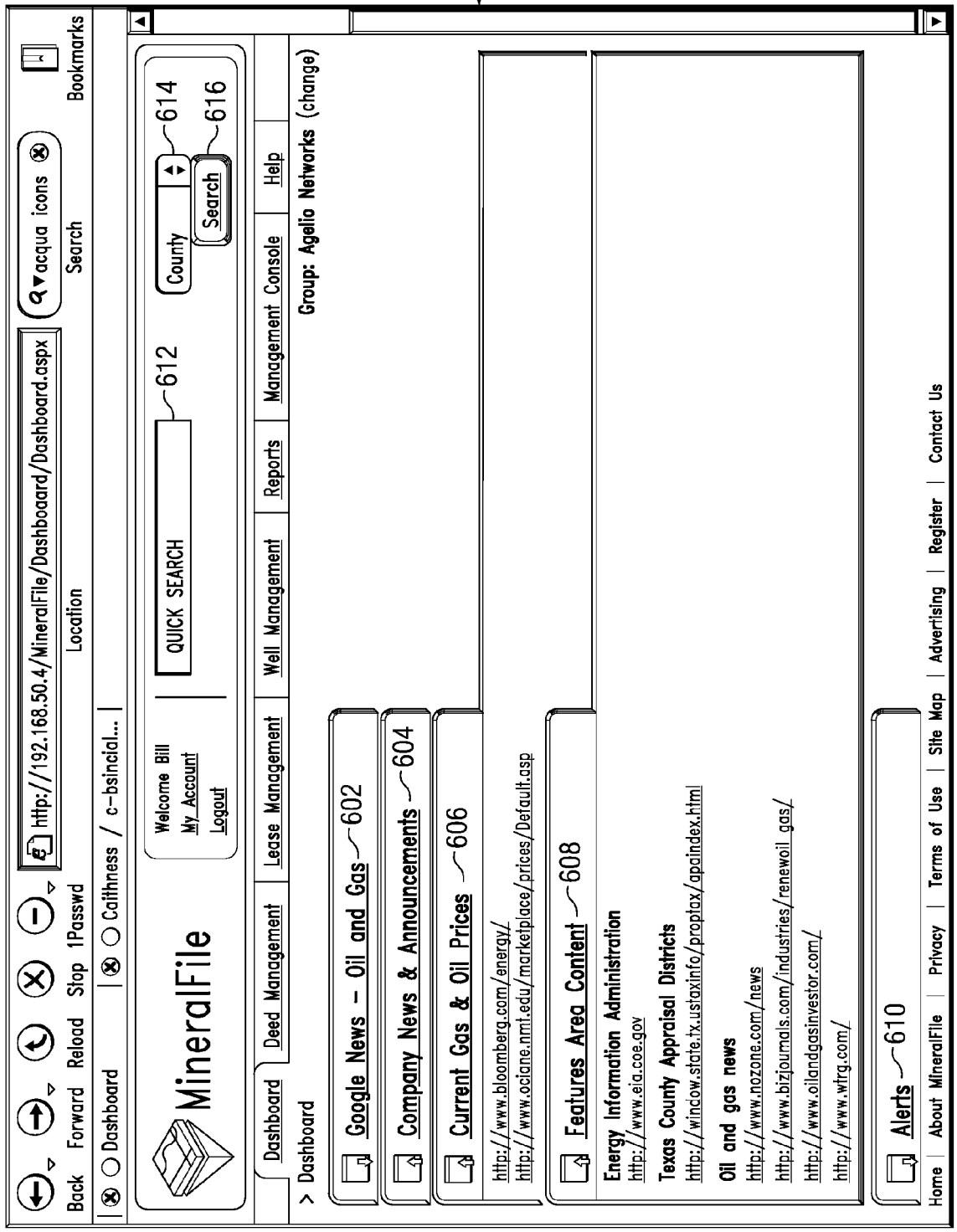
FIG. 6 illustrates the graphical user interface of the dashboard page.

Referring now to FIG. 6, there is illustrated the dashboard page as described previously with respect to FIGS. 4A-4B. The dashboard page 410 comprises a general information page including information that may be of particular interest to a user accessing the oil and gas mineral interest management system 102. The dashboard 410 includes an oil and gas news section 602 which when clicked by a user would provide a plurality of links in Google news (or other internet news service) relating to the oil and gas industry. The company news and announcements tab 604 is clicked to access various links relating to the company of the user that has logged on to the system. Of course, in the case of individual users, this tab would not be necessary. The current gas and oil prices tab 606 is clicked on to provide access to a number of internet links that provide information on current oil and gas prices. The features area content tab 608 is clicked on to provide access to various energy specific information areas that could be established by either the administrator of the oil and gas mineral interest management system 102 or alternatively could be designated by the user when establishing their profile through the management console page 464. Examples of this information include energy information administration and associated government links, state specific county appraisal districts and their associated access links and various industry specific websites providing oil and gas news. The alerts tab 610 provides user specific alerts that are provided to an individual that has accessed the system. Additionally, the quick search field 612 may have text information entered therein to enable a search of particular data areas through data field 614 enabling the user to search within particular areas of interest. The topic field 615 may include information on County, Deed ID (auto-generated), Lease Name, Operator Name and Well Name and the search is initiated by actuating a search button 616. The advanced search, when implemented should permit the user to search by nearly every data field in the system.

Figure 7:
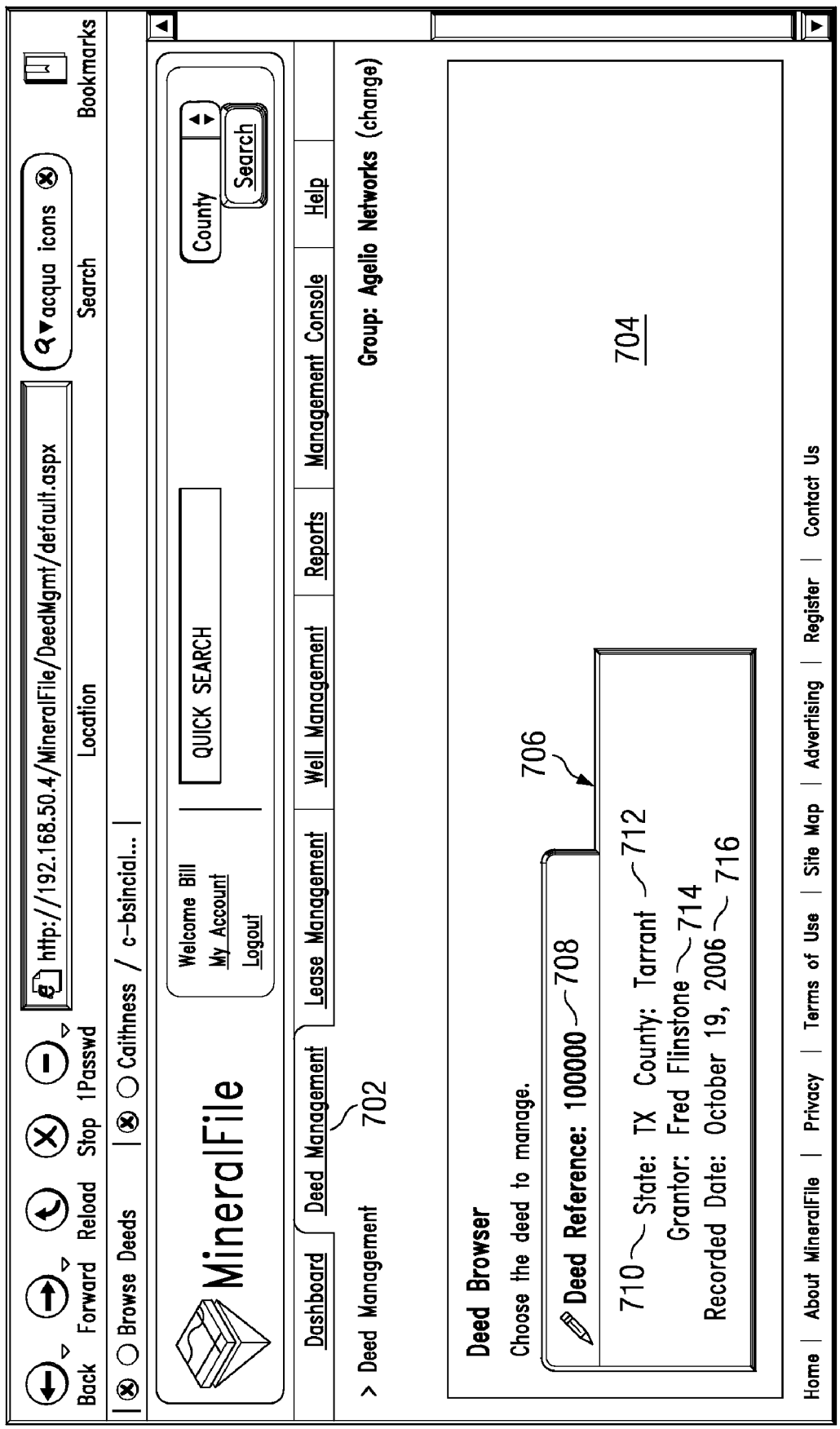
FIG. 7 illustrates the graphical user interface of the deed management page.

Referring now to FIG. 7, there is illustrated the deed management page 422 accessed by clicking on the deed management tab 702. The deed management tab 702 displays a deed browser field 704 including a number of visual deed indicators 706 associated with particular deeds. The deed indicator 706 indicates a deed reference field 708, a state field 710, a county field 712, a grantor field 714 and a recorded date 716. While FIG. 7 only illustrates a single deed indicator 706 in actual use, the deed browser 704 may include a plurality of deed indicators 706. When the deed indicator 706 is actuated by double clicking thereon, a deed maintenance page appears as illustrated in FIG. 8.

The deed maintenance field includes a deed overview tab 802. The deed overview tab 802 provides a data screen enabling the display of various general information with respect to the deed being accessed by its deed identifier 706. The state field 804 enables entry of the state in which the land referenced in the deed is located. The county field 806 enables the entry of the county in which the land is located. The grantor name field 808 enables entry of the name of the party granting the conveyance. The grantee name field 810 enables entry of the party to whom the conveyance has been granted. The volume field 812 enables entry of the volume in the county records where the deed is recorded. Likewise, the page field 814 enables entry of the page of the volume on which the deed is recorded, and the recorded date field 816 enables entry of the recordal date of the deed. The gross acres field 818 and net acres field 820 enable entry of the respective acreages associated with the land covered by the deed. Finally, the comments field enables entry of additional information associated with the deed. Once the information has been entered into the above described fields, the record associated with the deed may be updated by clicking on the update button 824.

Referring now to FIG. 9, there is illustrated the conveyances display opened responsive to clicking on the conveyances tab 902. The page including descriptions of the conveyed property and interests. The conveyances display illustrates the information associated with conveyances associated with the deed. The interest type field 904 provides an indication of the interest type, royalty interest, etc. that is transferred by the deed. The interest conveyed field 906 provides the percentage of the mineral interest that was conveyed. The conveyance description field 908 describes a short identifier of the conveyance. The tracts fields 910 provides information describing the tract in the conveyance including the tract number, the individual who performed the survey, the abstract and the block. A description of the land may also be provided. By clicking on the add new link 912 allows a user to enter additional conveyances associated with the deed being viewed. The system enables property to be entered in terms of survey/abstract or section/township/range depending on the state.

Figure 10:
FIG. 10 illustrates the graphical user interface of the conveyance interest maintenance page.

Referring now to FIG. 10, when the add new button is actuated, a conveyance interest maintenance window 1002 appears enabling the user to enter information with respect to the conveyance being described. The interest type field 1004 allows entry of the interest that has been conveyed. The conveyed interest maintenance field 1002 will appear responsive to actuating the add new link 914 which causes a conveyed interest maintenance window 1010 to appear with all of the data fields blank for adding a completely new conveyance or responsive to clicking of the add new link 912 which causes a conveyed interest maintenance window 1010 to appear having the information associated with the presently viewed conveyance to be displayed. In the first case, all of the data fields may be filled in to enter a new conveyance and in the second case, the data fields may be updated with new information as it becomes available.

The conveyed interest maintenance window 1002 includes an interest type field 1004 into which an identification of the interest that is transferred by the deed may be indicated. The interest conveyed field 1006 enables entry of the percentage of the interest that has been conveyed in a decimal format. The gross acres field 1008 indicates the total acreage included within the deed and the net acres field includes the net amount of acres based upon the interest conveyed. The tract number field 1011 provides for an indication of the identifier for a tract number and recording data may be recorded in the survey field 1012 for indicating the individual who surveyed the property. The abstract field 1014 indicates the abstract number for the property. A block field 1016 indicates the block of the property and the section field 1018 indicates the section of the property. The township field 1010 indicates the township of the property, and the range field 1022 indicates the range of the property. The land description field 1024 enables a full legal description of the land to be entered. This information is updated or entered by clicking on the update button 1026.

Referring now back to FIG. 9, the grantors fee tab 916 enables a display of information with respect to the grantors of the deed. The grantees field 918 enables display of information with respect to the grantees of the deed. The leases tab 920 permits the display of information with respect to leases that are associated with the deed. Similarly, the wells tab 922 enables the display of information with respect to wells that are associated with the deed. The attachments tab 924 enables the display and inclusion of electronic copies of physical documents that are associated with the deed, for example, the deed itself.

Referring now to FIG. 11, there are illustrated the display windows associated with clicking on the grantor tab 1102 and the grantee tab 1104. The grantor window includes fields for displaying information on the name, address and telephone number of the grantor of the deed. An add new button 1106 enables a user to add an additional grantor and fill in the fields associated with the name, address, telephone number and email address. The information within the grantor field may additionally be edited or updated by a user, as necessary, by clicking on an edit button 1108. The grantee window includes fields for displaying the name and address of the grantee. An edit button 1110 enables this information to be updated as necessary. An add new button 1112 enables new grantees to be entered with respect to associated deeds as appropriate.

Referring now to FIGS. 12A-12B, there is illustrated the display area associated with the leases tab 1202 and the wells tab 1204. The leases display area includes a number of fields for displaying information associated with a particular lease. The information may be updated by clicking on an edit button 1206 or a new lease may be added by clicking on an add new button 1208. The leases display area includes a lease name field 1210 for displaying an identifier for the lease, a lease type field 1212 for identifying the type of leases, a lease bonus total field 1214 for receiving various information relating to recording data can be stored in a volume field 1116, a gross acres field 1218, a royalty field 1220 illustrating the percentage of the royalty interest and the held by production (HBP) field 1220. The institution date of the lease is indicated in field 1224 and the expiration date of the lease is indicated in field 1226. Information with respect to continuous drilling clauses is illustrated is in the drill clause field 1228 and the drill period field 1230. Additional fields include the per acre field 1232, page field 1234, net acres field 1236, HBP acreage field 1238, primary term field 1240, pugh clause field 1242 and the start date field 1233 and end date field 1246. Additional tracts of land associated with the lease may be indicated in field 1248. Additional lessees can be added to the lease information using add new button 1250 or additional lessors may be added to the lease information using add new button 1252.

The wells tab 1204 provides a display of the wells information area which also includes a number of fields for providing data on wells within a particular lease. New wells may be added by clicking on the add new button 1254. Existing well data may be updated by clicking on the edit button 1256. Particular well data fields include the well name field 1258 for providing identifying information on the well name, an associated lease field 1260 for providing the lease with which the well is associated, a well type field 1262 for indicating the type of well, and a Railroad Commission (RRC) number field 1264 provides the RRC number. Decimal interest field 1266 and division order decimal interest 1168 provide decimal interest information on the well, and a purchaser's field 1270 may indicate the product purchasers of the well. Well status field 1272 enables an indication of the present operating status of the well, and the American Petroleum Institute (API) number of the well is indicated in field 1274. Field 1276 provides for a check decimal interest and field 1278 provides for an engineering decimal interest. The operator field 1280 provides an indication of the operator of the well. Additional purchasers may be added using an add new button 1280. The attachments tab 1282 enables a display of documents that are associated with a particular deed. Additional documents may be added to the attachment section by clicking on add new button 1284.

Figure 13:
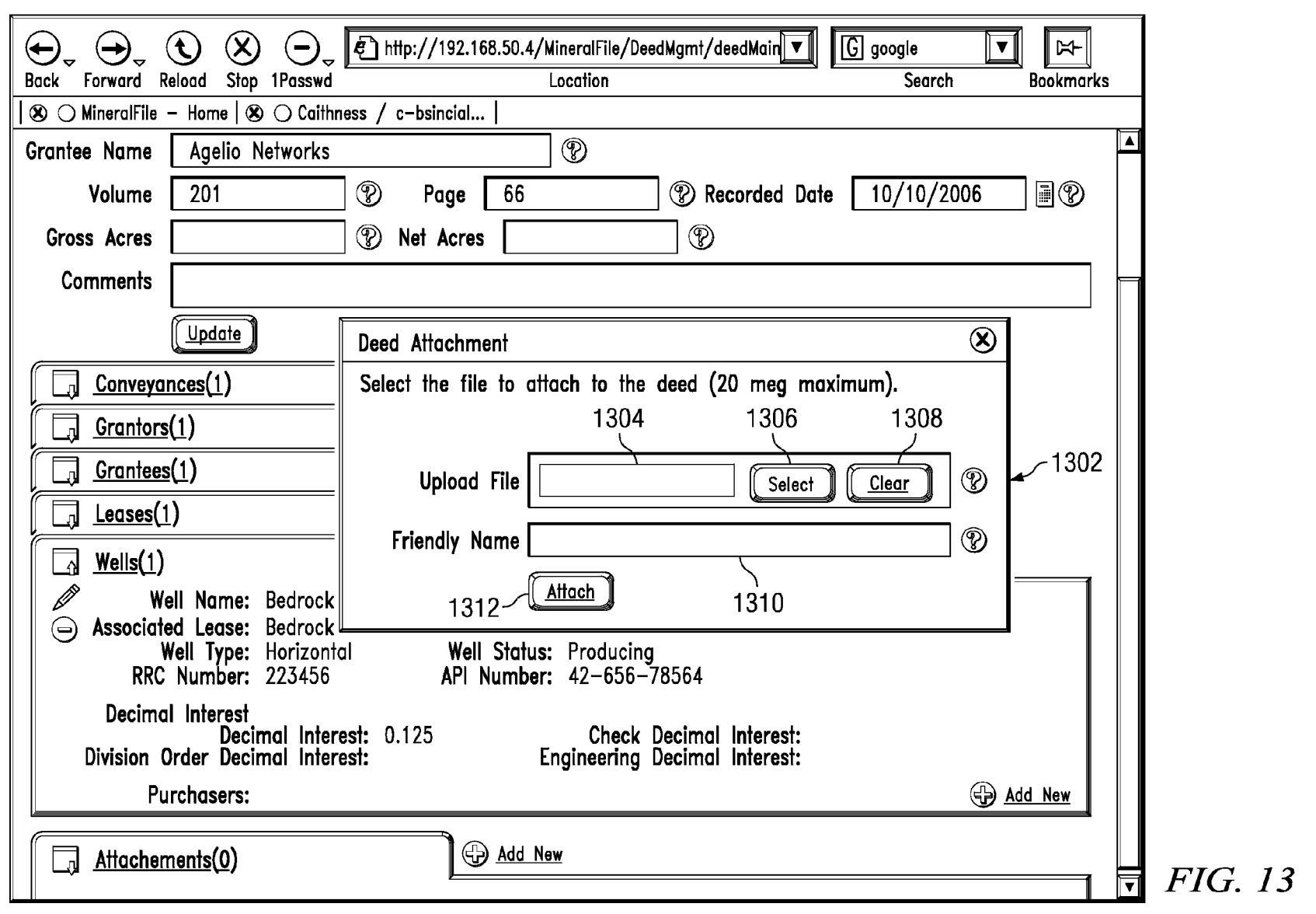

When a user clicks on the add new link 1284 to add a new attachment to the deed, the deed attachment window 1302, as illustrated in FIG. 13, is displayed. The deed attachment window 1302 enables a file to be uploaded into the oil and gas mineral interest management system 102. This is a first implementation of the virtual filing system. The file field 1304 enables a user to enter the present location that the file to be attached is stored. The select button 1306 enables a user to browse their computer to locate the file to be uploaded. The clear button 1308 allows the entered upload file information in the field 1304 to be cleared. The friendly name field 1310 comprises a meta-tag that enables the user to provide a name to be associated with the uploaded file. The field 310 assists in future search capabilities. Once the file location and file name have been entered, the information is placed within the attachments section 1282 by clicking on the attach button 1312.

Figure 14:
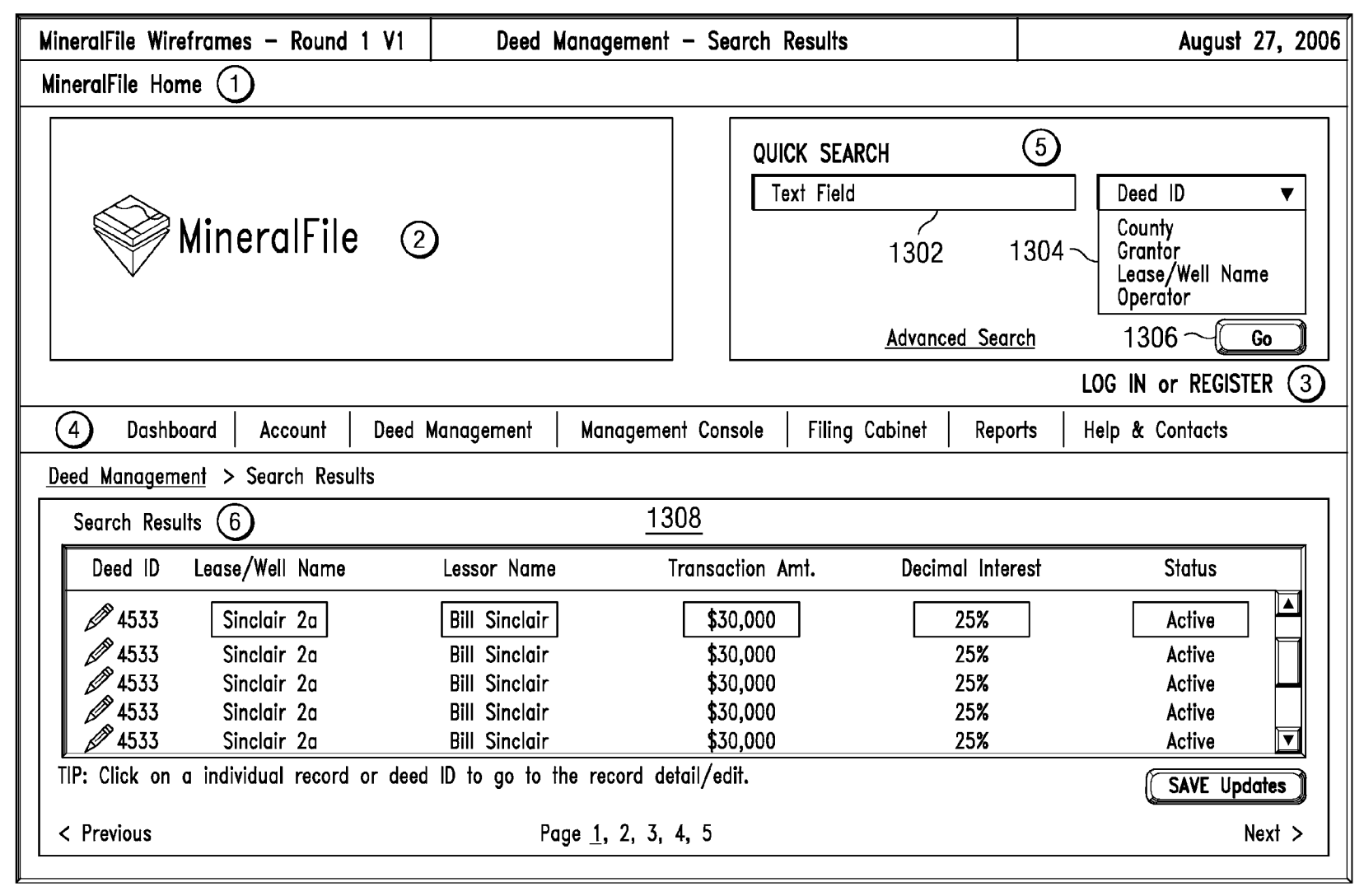

Referring now to FIG. 14, there is illustrated the manner in which entered deed information may be searched to provide a list of particular deeds stored within the oil and gas mineral interest management system 102. As described previously, within the quick search area a word identifier to search on may be inserted within a text field 1402. The user selects a particular search topic to search for the entered text information in a drop down menu 1404. The drop down menu may include things such as deed ID, county, grantor, lease/well name, or operator. By clicking on the search button 1406 a search result window 1408 is displayed to the user including the results of the search requested in the quick search area.

Figure 15:
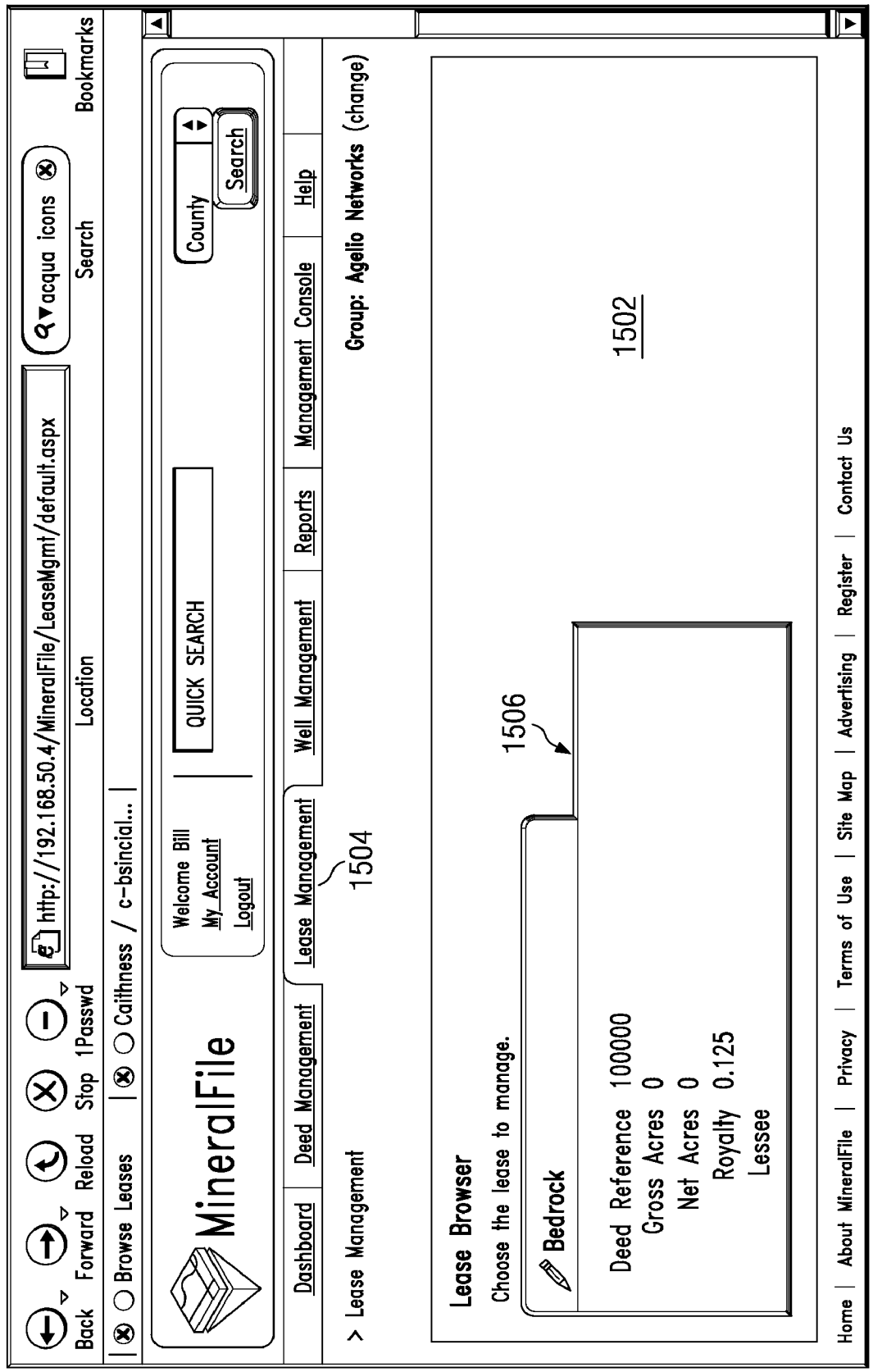
FIG. 15 illustrates the graphical user interface for the lease browser page.

Referring now to FIG. 15, there is illustrated the lease browser window 1502 that is accessed by clicking on the lease management tab 1504. The lease browser window 1502 displays visual lease identifiers 1506 associated with each of the leases within the oil and gas mineral interest management system 102. The visual lease identifier 1106 includes a name of the lease, a deed reference, a gross acreage, net acreage, royalty interest, and the lessee name. While the illustration of FIG. 15 illustrates only a single lease identifier 1506 in practice, a plurality of lease identifiers 1506 would be located within the lease browser window 1502. By selecting one of the lease visual identifiers 1506 by double clicking thereon using a mouse or other pointing device, a user may manage a particular lease and update information with respect thereto. By double clicking on the lease identifier 1506 the lease maintenance window 1602 illustrated in FIG. 16 is opened.

The lease maintenance window 1602 includes a lease name field 1604 for entering a name associated with the lease. A lease type menu 1606 allows the user to use a drop down menu to select the type of lease. A lease bonus section includes a total field 1608 enabling entry of lease bonus totals and a per acre value in a field 1610. A recording data section includes a volume field 1612 for recording volume book, a gross acres field 1614, and a royalty percentage field 1616. HBP may be selected from a drop down menu 1618. Institution dates for the lease are entered in fields 1620 and expiration dates for the lease are entered in field 1622. Page of the volume wherein the data is recorded is listed in field 1624, and the net acres of the lease is listed in field 1626. The amount of HBP acreage is entered in field 1828, and the primary term in years of a lease is listed in field 1630. Drop down menu 1632 enables an indication of whether or not a pugh clause is included within the lease.

The continuous drilling section provides an indication of whether or not a drill clause is used through a drop down menu 1634. A drill period for the continuous drilling clause is entered into field 1636 and start date field 1638 and end date field 1640 enables entry of the starting and ending dates of the continuous drilling clause. A select tract field 1614 enables selection of related property tracts. Newly entered information is updated by clicking on the update button 1644. In addition to displaying this information through the lease management tab 1504, the entered lease information is displayed within the leases section 1202 under the deed management tab 702. Referring now back to FIG. 15, the quick search area 1508 is used to search for particular types of information within the lease information in a manner similar to that described previously with respect to the deed management search.

Figure 17:
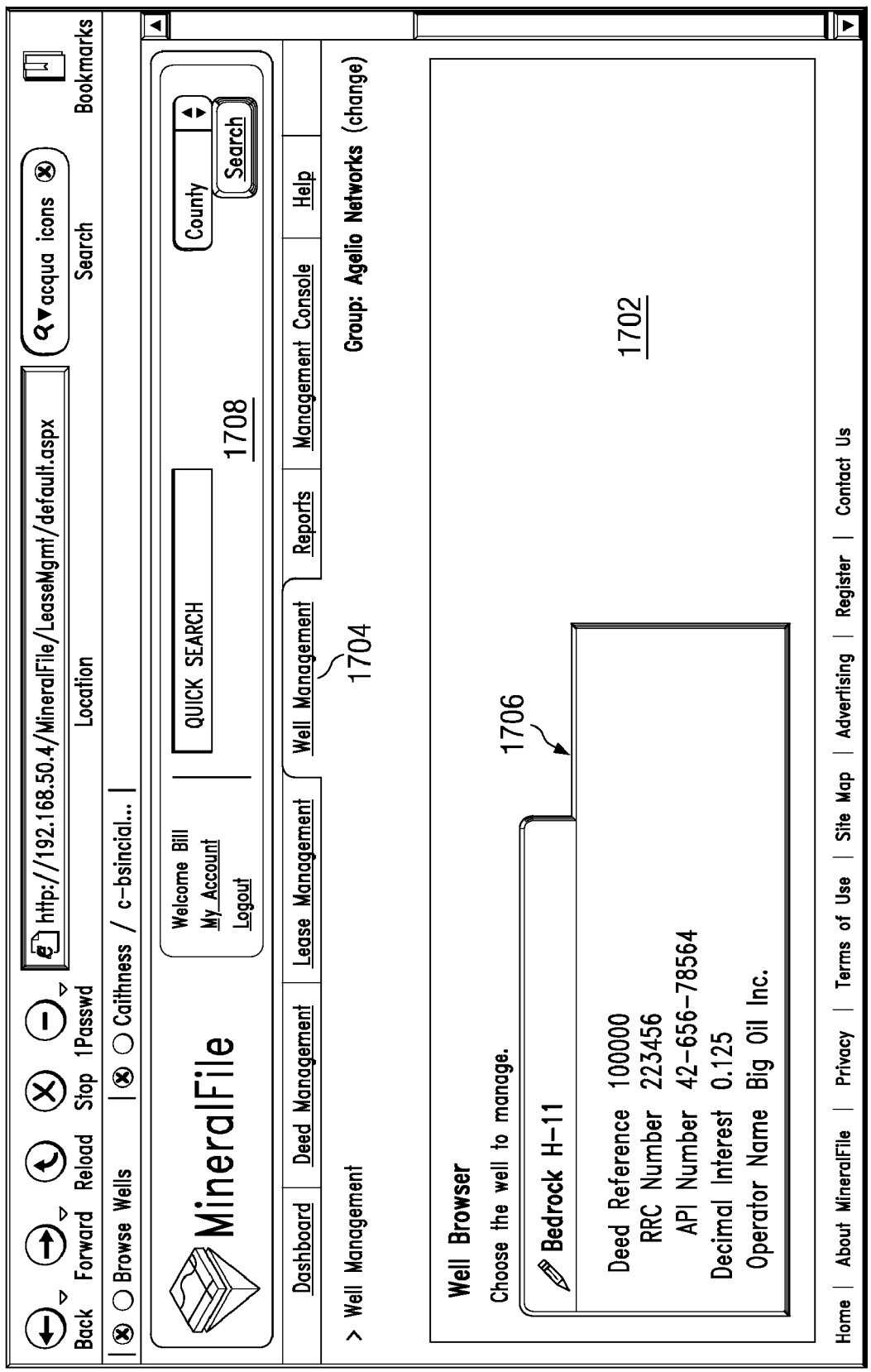
FIG. 17 illustrates the graphical user interface for the well browser page.

Referring now to FIG. 17, there is illustrated the well browser window 1702 that is displayed responsive to clicking on the well management tab 1704. Similar to the lease management window the well browser window 1702 displays a plurality of visual well indicators 1706. While the present illustration includes only a single well indicator 1706, as a practical matter the well browser window 1702 would include a plurality of visual well indicators 1706 representing a number of wells entered within the system. Each well indicator 1706 includes an indication of an identifier from the well, a deed reference, an RRC number, and API number, a decimal interest and an operator name.

Figure 18:
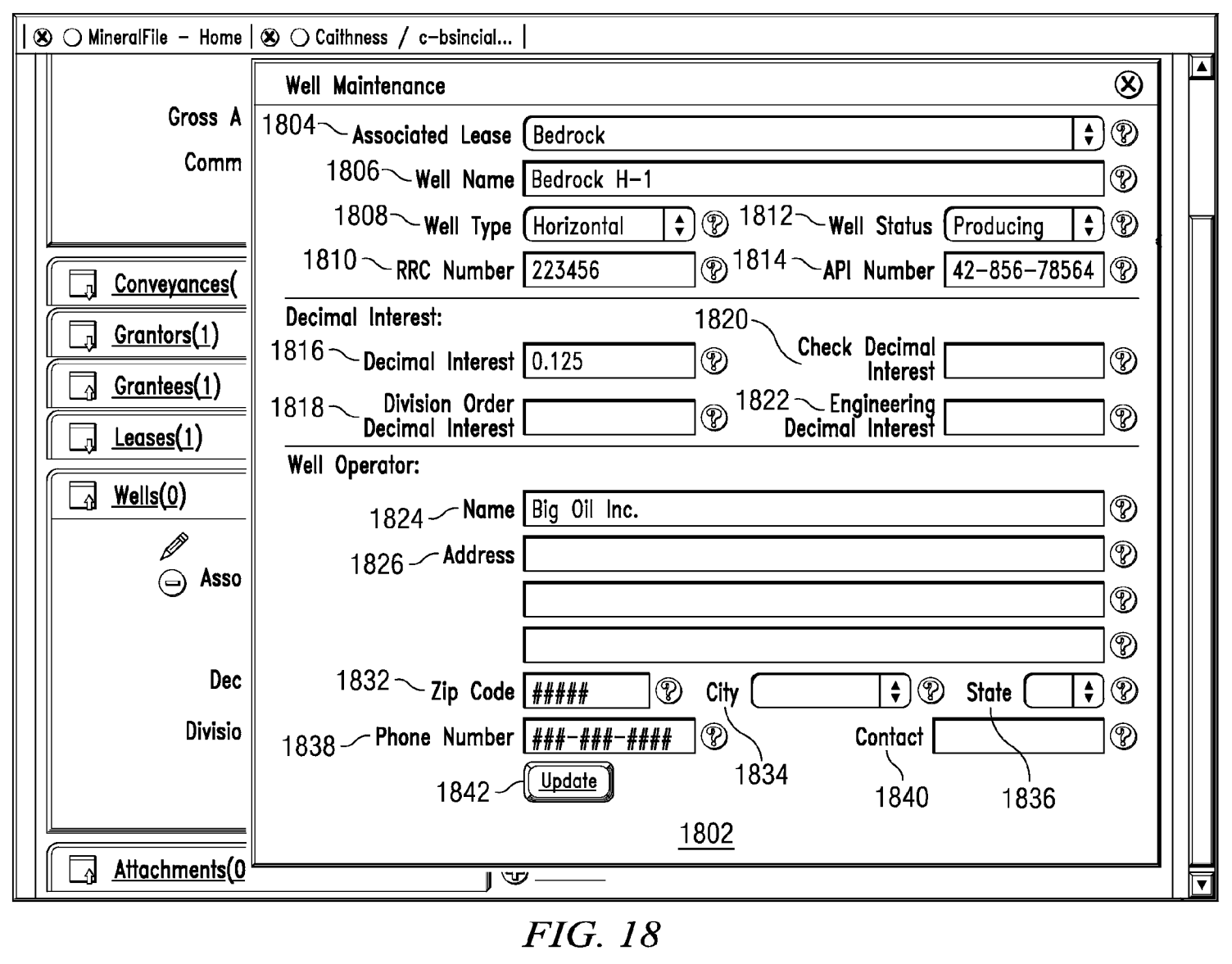

By double clicking on the visual well indicator 1706, a well maintenance window 1802 will appear as illustrated in FIG. 18. Through the well maintenance window 1802, a user may update the various data fields providing information on the well being managed. The associated lease field 1804 provides an indication of the lease on which the well is located. This information may be accessed via a drop down menu which lists all of the leases that have been entered within the oil and gas mineral interest management system 102 by this particular user or company. The well name field 1806 provides a location for entering a well identifier established by the user. The well type field 1808 includes a drop down menu enabling an indication of the well type of the well. The RRC number field 1810 enables entry of the RRC number of the well. The well status field 1812 comprises a drop down menu for an indication of the status of the well. The API number field 1814 enables entry of the API number of the well. The decimal interest section of the well maintenance window 1802 includes data fields for entry of the decimal interest 1816, entry of the division order decimal interest 1818, entry of the check decimal interest 1820 and entry of the engineering decimal interest 1822.

The well operator section of the well maintenance window 1802 includes a name field 1824 for entering the name of the company that is operating the well. An address field 1826 provides fields for entering an address of the well operator. A zip code field 1832 enables entry of the zip code, and a drop down menu 1834 provides for entry of the city of the well operator and drop down menu 1836 provides for a entry of the state. A phone number field 1838 enables entry of the well operator's phone number, and a contact field 1840 provides for the contact person of the well operator. Information that has been changed may be updated by activating the update button 1824.

Referring now back to FIG. 17, a quick search field 1708 enables the user to quickly enter a text search term and category in order to search through the various well information. The quick search option is pervasive throughout the system.

Figure 19:
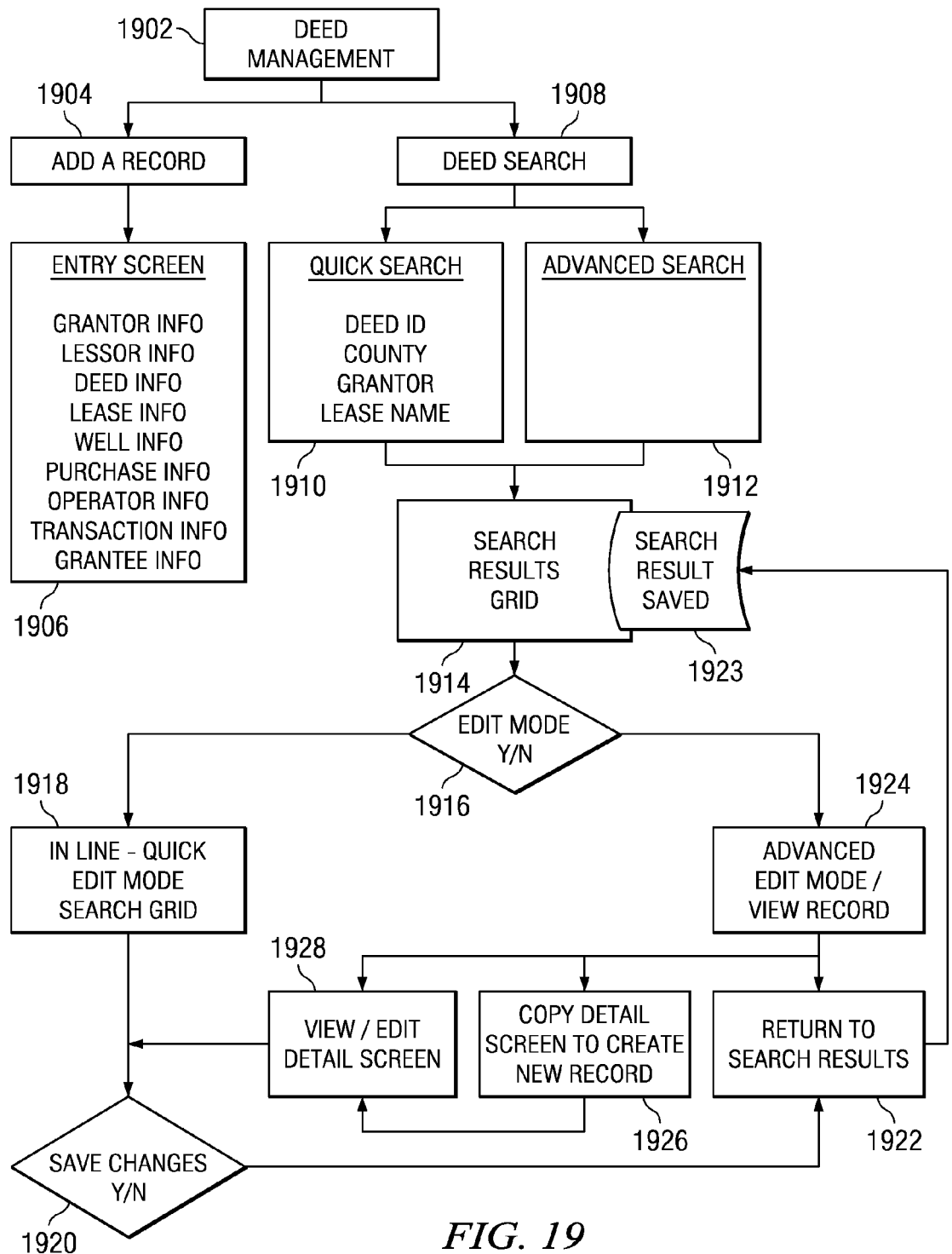
FIG. 19 illustrates a flow chart describing the manner in which various mineral interests management processes may be controlled using the described system.

Referring now to FIG. 19, there is illustrated a flow chart describing the manner in which various mineral interest management processes can be performed through the deed management screen of the oil and gas mineral interest management system. After accessing the deed management screen at step 1902, the user may choose to add a new record indicating a new deed at step 1904. The user is provided the data entry screen at step 1906 where they can enter the grantor information, lessor information, deed information, lease information, well information, purchaser information, operator information, and transaction information depending on the record being added. Alternatively, the user can choose to do a deed search 1908 through the quick search function 1910 or using an advanced search function 1912. The quick search function 1910 allows a search based upon deed ID, county, grantor or lease name. The advanced search function allows a user to perform a more advanced search including searching simultaneously by multiple fields, the ability to exclude words or phrases and the ability to save advanced search queries for future use.

The search results grid is presented at step 1914. Inquiry step 1916 determines whether the user desires to enter a quick edit mode or advanced edit mode. If the quick edit mode is selected, the in-line quick edit mode search grid is presented at step 1918 wherein the user may quickly make changes within the quick edit screen. The changes are saved at step 1920 and the user returns to the search results at step 1922 before the search results are saved at step 1923. If the user enters the advanced edit mode, the advanced edit mode is presented through the user interface at step 1924. From the advanced edit mode, the user may return to the search results at step 1922 and save these results at step 1923. At step 1926 the user may use the copy detail screen to complete a new record within the system. Alternatively, at step 1928, the user may pass to the view/edit detail screen to allow the new entry of information within the various fields described in the deed, lease and well information screens described previously. Whether a new record is created at step 1926 or an existing record is modified at step 1928, the changes are saved at 1920 and the user returns to their search results at step 1922. All search results are saved at step 1923.

Figure 20A:
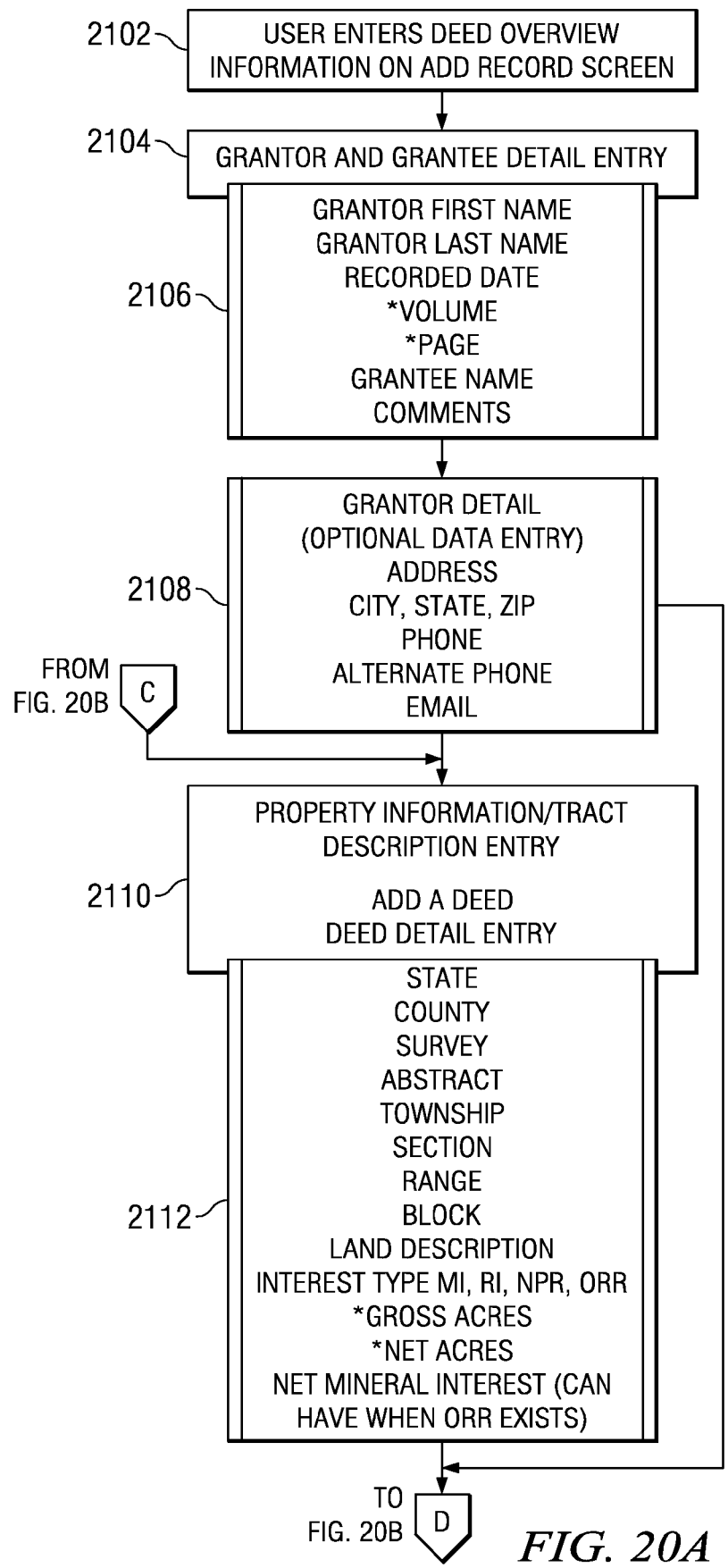
FIGS. 20A-20C are flow diagrams illustrating the manner for entering new information with respect to deeds, leases and wells.
Figure 20B:
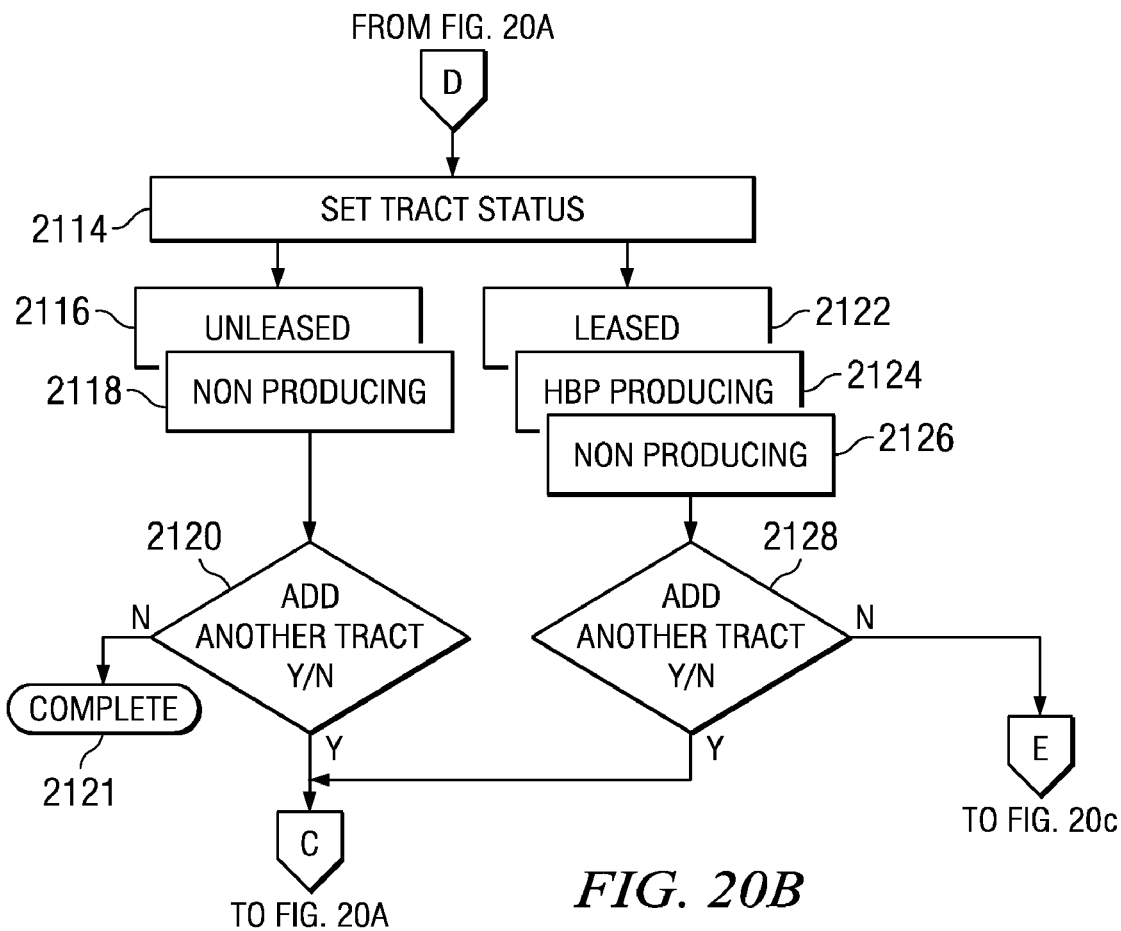

Referring now to FIGS. 20A-20B, there is illustrated a more detailed description of the manner in which new information may be entered with respect to a deed, associated leases, and wells contained within the deeds and leases. The process is initiated at step 2002 wherein a user enters deed overview information on the add records screen. Next, at step 2004 the grantor and grantee detail are entered. The grantee information is entered at step 2006 and includes the grantor first and last name, the record date, the volume and page number of the deed recordal, the grantee name, and any desired comments. The grantor detail is entered at step 2008 wherein the address, state, zip, phone and email information for the grantor are entered. At step 2010, the property information/tract description data is entered. This involves adding the deed and any detail entry at step 2012 including the state, county, survey, abstract, township, section, range, block, land description, interest type, net acres, net mineral interest, and overriding royalty interest of the deed. The status of the tract is established at step 2014. If the tract is an unleased tract, it is defined as an unleased tract at step 2016 and indicated as a non-producing tract at step 2018. Inquiry step 2020 determines if there exists another tract of land to enter and, if so, control passes back to step 2010. Otherwise, the process is completed at step 2021.

If the tract is defined as a leased tract at step 2022 it may be established as an HBP producing tract at step 2024 or as a non-producing tract at step 2026. Inquiry step 2028 determines if there is another tract and, if so, control passes back to step 2010. If no further tracts are to be entered, control passes to step 2030 wherein a lease may be added. At step 2032, the lessor detail, lease detail, and lessee detail are entered into the newly created lease record. Inquiry step 2023 determines if there exists another lease with respect to the tract and, if so, control passes back to step 2030. If an additional lease does not exist, control passes to step 2034 and a well may be added that is included with the lease. The well details, decimal interest, purchaser details, and operator details may be entered with the newly created well record at step 2036. Inquiry step 2040 determines if there exists another well, and if so, a new well record is created at step 2034. If no further well exists, the process is completed at step 2042.

Referring now to FIG. 21, there is illustrated the reports window 2102 that is displayed responsive to clicking on the reports tab 2104 from the main navigation page. Available reports contained within the reports window 2102 may be accessed via the available reports tab 2106. The available reports include a plurality of PDF, JPEG or other electronic copies of physical documents that may be viewed by a user. Using the quick search fields 2108, the available reports may be searched through to find a specific report if a number of reports is too large for viewing in a single screen are available. Additionally, a generates reports tab 2108 may provide a user with the ability to generate user defined reports that are based on user established parameters from oil and gas mineral interest data stored within the system. After generating a report it may be viewed, printed or exported to a number of file formats including XML, comma-separated valves (CSF), HTML and PDF.

Referring now to FIG. 22, there is illustrated one example of a pre-established report that may be accessed via the available reports tab 2106. This report illustrates mineral interest for sales in Fayetteville. Referring now also to FIG. 23, there is illustrated a financial report that could be existing and stored under the available reports tab 2106, or alternatively, might be generated from stored data under the generate reports tab 2108.

Referring now to FIG. 24, there is illustrated the manage users page 2402 that is accessed responsive to clicking on the management console tab 2404. The manage users page 2402 includes a current members tab 2406 that lists all users that are currently registered with the system. The current members tab 2406 includes an edit icon 2408 which may be activated to edit the profile of a particular user. An email address for the user is listed in column 2410. The first and last names of the user are listed in columns 2412 and 2414 respectively. Column 2416 includes a "locked" indicator box which may be checked to lock a particular user out of the system for any desired reason. A user is also locked out if their password is incorrectly entered too many times to prevent brute force security attacks. A last log-in column 2418 includes the date and time that a user last logged on to the oil and gas mineral interest management system 102. An add member link 2410 allows a user to click on the link to add a new member to the system.

Referring now to FIG. 25, there is illustrated the user profile page that is displayed responsive to clicking on the edit button 2408 or the add a member link 2420. When clicking on the edit button 2408, a user profile appears having each of the data fields already filled in from a previous record. When the add member link 2420 is clicked, the user profile page appears with each of the fields empty. The user information section 2502 includes an email address field 2504 for the user to enter their email address, a phone field 2506 for entry of a phone number and an alternate phone field 2508 for entry of a further phone number. The web address field 2510 provides for entry of a web address associated with the customer if the user comprises, for example, a company. Address field 2512, city field 2514, state field 2516 and zip field 2518 enable the user to enter their full mailing address. All of the information that is edited or entered within the user information section 2502 is saved by clicking on the save button 2520. The email preferences section 2502 enables the user to select whether they wish to receive a monthly news letter or receive scheduled report subscriptions and to save these preferences. Finally, the change password section 2524 enables the user to enter their old password 2526, to enter a new password in field 2528 and to confirm this password in field 2530 such that by pressing a change button 2532, the password may be changed to the newly entered password.

Figure 26:
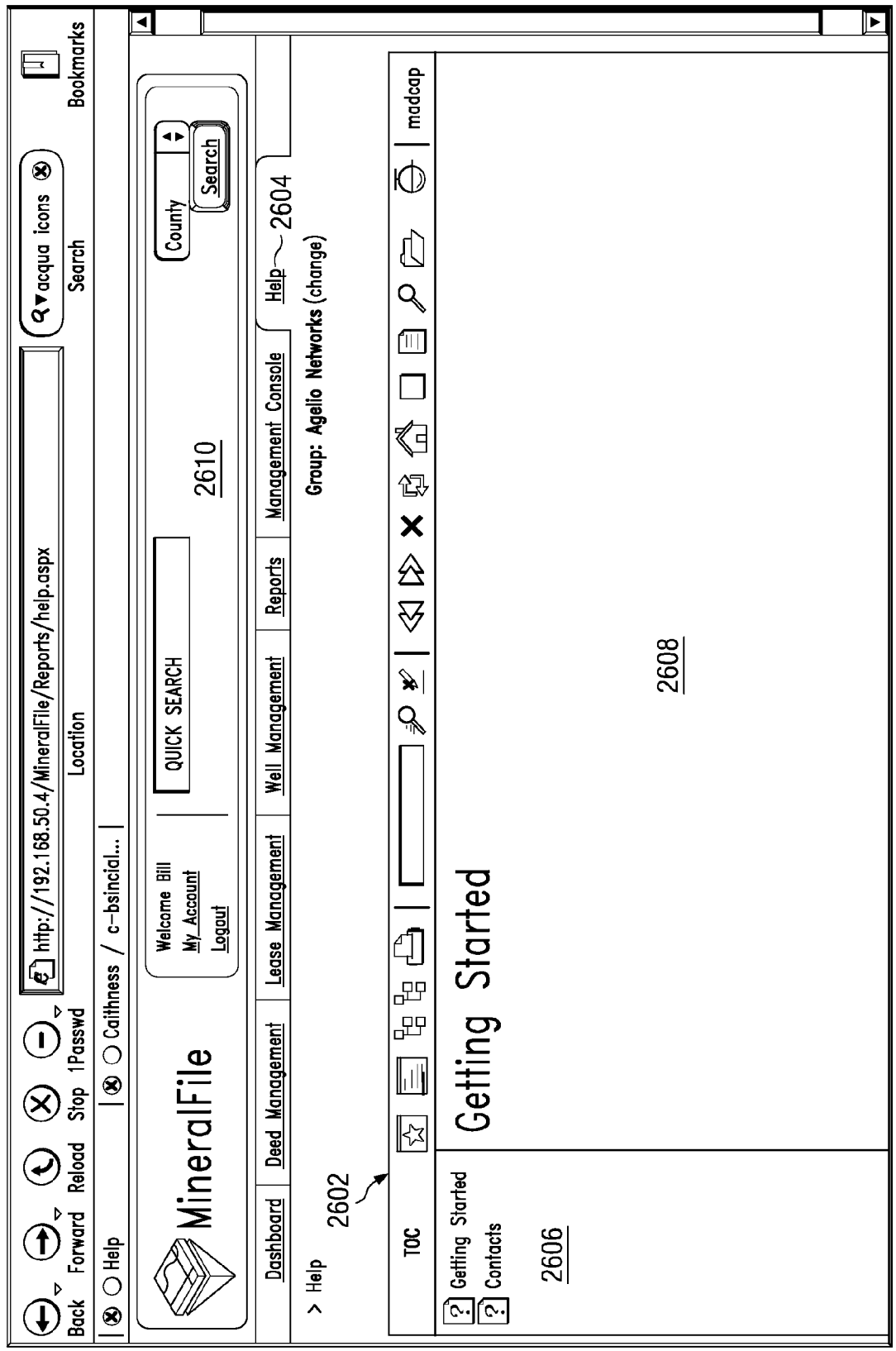
FIG. 26 illustrates the graphical user interface for the help page.

Referring now to FIG. 26, there is illustrated the help screen 2602 that is displayed responsive to clicking on the help tab 2604. The help screen 2602 includes an index section 2606 and an information section 2608. By clicking on topics or links within the index section 2606 information with respect to that topic is displayed within the information window 2608. The user may additionally utilize the quick search functions 2610 to search through the index of topics for particular information of interest.

Figure 27:
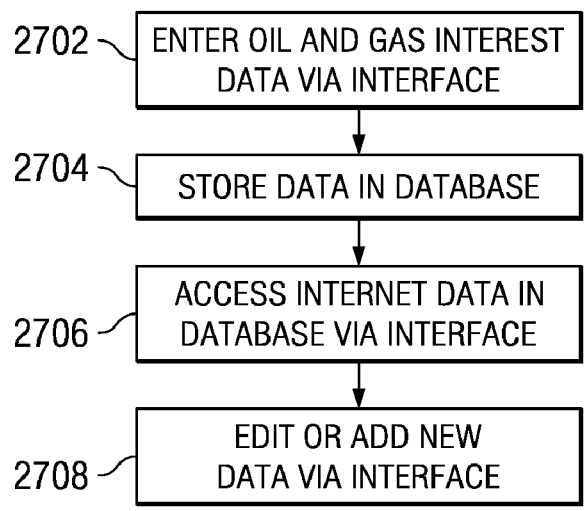
FIG. 27 illustrates a flow chart describing the general operation of the oil and gas mineral management system.
Figure 20C:
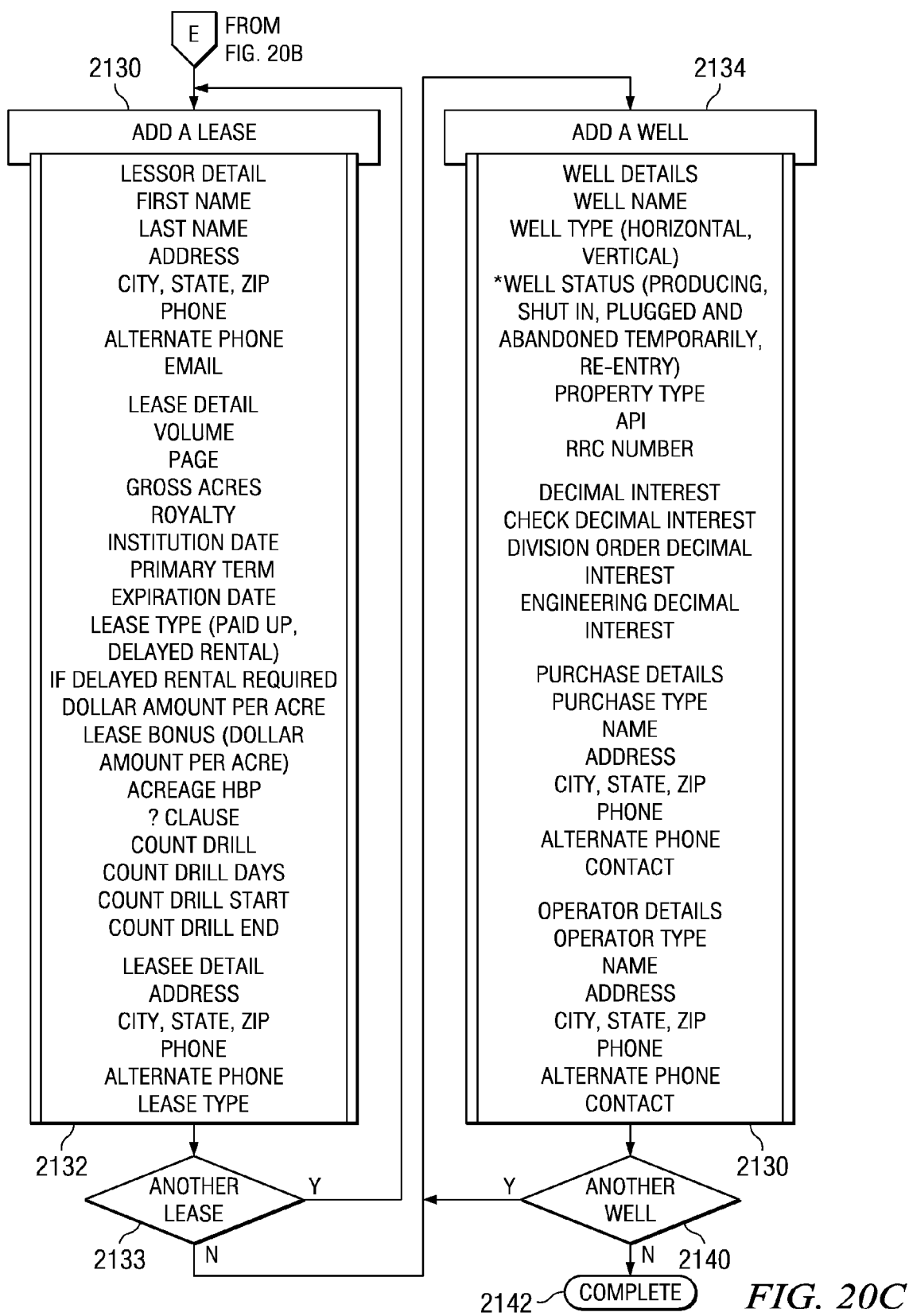

Referring now to FIG. 27, there is illustrated the general operation of the oil and gas interest mineral management system when operating via an open network such as the internet. Various oil and gas interest data is entered via the interface wherein a user is accessing the system at 2702. This information is transmitted via the internet and stored within the centralized database at step 2704. Data stored within the centralized database may be accessed at step 2706 via the user interface over the internet Once the data has been accessed, the user may edit the data or add new data or research the stored data using the user interface at step 2708. In this manner, all the data may be manipulated and managed through the interface.

It will be appreciated by those skilled in the art having the benefit of this disclosure that this invention provides a system for managing mineral interests. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A system for managing mineral interest, comprising:
   a computer;
   at least one database for storing oil and gas mineral interest data associated with an area of land, said oil and gas mineral interest data including deed records relating to deeds relating to oil and gas mineral interests associated with the area of land, lease records relating to leasing of oil and gas mineral interests associated with the area of land, and well records associated with wells drilling on the oil, and gas mineral interests associated with the area of land;
   at least one server for enabling generation of a graphical user interface in a web browser at a plurality of locations over an open network, the graphical user interface enabling creation and editing of the deed records, lease records and well records stored in the at least one database from the plurality of locations over the open network, the graphical user interface further enabling viewing of deed records, lease records and well records from the plurality of locations over the open network, wherein the at least one server provides a view of a mineral interest via the graphical user interface which shows a relationship between at least one instance of a deed record, at least one instance of a lease record, and at least one instance of a well record;
   a deed management page provided by the at least one server enabling a user to generate new deed records and edit existing deed records stored in the at least one database as part of the oil and gas mineral interest data;
   a lease management page provided by the at least one server enabling a user to generate new lease records and edit existing, lease records stored in the at least one database as part of the oil and gas mineral interest data comprising at least one of royalty data and land description data; and
   a well management page provided by the at least one server enabling a user to generate new well records and edit existing well records stored in the at least one database as part of the oil and gas mineral interest data.

2. The system of claim 1, wherein the open network comprises an Internet.

3. The system of claim 1, wherein the at least one server further generates reports from the data records relating to the oil and gas mineral interests stored in the at least one database responsive to parameters provided from the graphical user interface, wherein the reports provide the view of the mineral interest as well as a view of at least one of lease records and deed records associated with the area of land.

4. The system of claim 1, wherein the at least one server enables electronic copies of mineral interest documents to be associated with the data records using an attachment section displayed by the graphical user interface and wherein the attachment section is provided by at least one of the deed management page, lease management page, and well management page.

5. The system of claim 1, wherein the at least one server enables management of system users using the graphical user interface.

6. The system of claim 1, wherein the graphical user interface further provides an information page for displaying oil and gas mineral interest related information downloaded from the open network responsive to user established parameters entered via the graphical user interface.

7. A system for managing oil and gas mineral interests over an Internet, comprising:
   a computer;
   a navigation page provided by a server, the navigation page enabling a user to create and edit, via a graphical user interface of a computer, deed records, lease records and well records relating to oil and gas mineral interests in a selected area of land, the oil and gas mineral interests being stored in at least one database accessible over the Internet, the graphical user interface further enabling the user to view such mineral interests which display a relationship between at least one instance of a deed record, a lease record, and a well record for the selected area of land;
   a deed management page provided by the server enabling the user to generate new deed records and edit existing deed records stored in the at least one database, wherein the deed management page also enables a user to define relationships between a deed record and at least one of a lease record and well record;

a lease management page provided by the server enabling a user to generate new lease records and edit existing lease records stored in the at least one database, wherein the lease management page also enables a user to define relationships between a lease record and at least one of a deed record and well record; and a well management page provided by the server enabling a user to generate new well records and edit existing well records stored in the at least one database, wherein the well management page also enables a user to define relationships between a well record and at least one of a deed record and lease record.

8. The system of claim 7, wherein the graphical user interface enables the generation of reports from the data records relating to the oil and gas mineral interests stored in the at least one database responsive to parameters provided via the graphical user interface.

9. The system of claim 7, wherein the graphical user interface enables electronic copies of mineral interest documents to be associated with the data records using the graphical user interface.

10. The system of claim 7, wherein the graphical user interface further provides an information page for displaying oil and gas mineral interest related information downloaded from the open network responsive to user established parameters entered via the graphical user interface.

11. The system of claim 7, wherein the graphical user interface enables management of system users.

12. An apparatus, comprising:
a computer readable storage medium containing a set of instruction for a general purpose computer;
wherein execution of the set of instructions by the general purpose computer configures the general purpose computer to:
generate a graphical user interface which is presented to a user via a browser operating on a computer, the graphical user interface enabling the user to manage oil and gas mineral interests over an Internet, wherein the graphical user interface further enables creation and editing of relationships between deed records, lease records and well records relating to oil and gas mineral interests stored in at least one database accessible over the Internet, the graphical user interface further enabling viewing of the user-defined relationships between deed records, lease records and well records over the Internet via a report, wherein the report displays, for at least one area of land, at least one of the following: (i) well records and lease records associated with the well records and (ii) lease records and deed records associated with the lease records;
generate new deed records and edit existing deed records stored in the at least one database;
generate new lease records and edit existing lease records stored in the at least one database; and
generate new well records and edit existing well records stored in the at least one database.

13. The apparatus of claim 12, wherein the graphical user interface provides an editable graphical page for each deed record, lease record and well record responsive to a user input to a graphical icon associated with a corresponding deed record, lease record and well record in the graphical user interface, the editable graphical page enabling the creation and editing of the associated deed record, lease record and well record.

14. The apparatus of claim 12, wherein the graphical user interface enables the generation of reports from the data records relating to the oil and gas mineral interests stored in the at least one database responsive to parameters provided via the graphical user interface.

15. The apparatus of claim 12, wherein the graphical user interface enables electronic copies of mineral interest documents to be associated with the data records using the graphical user interface.

16. The apparatus of claim 12, wherein the graphical user interface enables management of system users.

17. The apparatus of claim 12, wherein the graphical user interface further provides an information page for displaying oil and gas mineral interest related information downloaded from the open network responsive to user established parameters entered via the graphical user interface.

18. A computational device comprising a user interface and a browser, the user interface configured to display information to a user of the computational device that has been obtained by the browser from an oil and gas mineral interest management system over the Internet, wherein the user interface is configured by the oil and gas mineral interest management system to display one or more screens including at least one of the following: a report screen that provides access to one or more mineral interest reports, the one or more mineral interest reports including at least one of the following: (i) a report listing leases for non-producing wells; (ii) a report listing leases for producing wells; (iii) a report which displays land conveyances by at least one of State and County; (iv) a report which displays at least one of lease and well data for an interest owner; and (v) a report which lists leases owned by an interest owner a deed management screen which, when viewed, enables a user of the computational device to add and/or edit deed records by communicating with the oil and gas mineral interest management system; a lease management tab screen, when viewed, enables a user of the computational device to add and/or edit lease records by communicating with the oil and gas mineral interest management system; and a well management tab screen, when viewed, enables a user of the computational device to add and/or edit well records by communicating with the oil and gas mineral interest management system.

19. A method, comprising:
receiving, at an interest management system, one or more data input communication packets that have been transmitted over the Internet, the one or more data input communication packets containing lease data inputs that have been provided by a user in a lease data input field in a lease management page, wherein the lease data inputs comprise an identification of an area of land associated with a lease as well as one or more of a royalty amount for the lease, an identification of a lessor, an identification of a lessee, and a term of the lease; and
storing the lease data inputs into a database.

20. The method of claim 19, further comprising:
receiving, at the interest management system, one or more query communication packets that have been transmitted over the Internet, the one or more query communication packets containing a query parameter that matches at least one of the lease data inputs stored in the database;
performing, by the interest management system, a database lookup with the query parameter;
preparing query results based on the database lookup, the query results including well information that is related with the lease data inputs by virtue of being associated with the same area of land that was identified in the lease data inputs; and
providing, over the Internet, the query results to a computer which transmitted the one or more query communication packets.

* * * * *